(12) United States Patent
Tanaka et al.

(10) Patent No.: US 7,775,475 B2
(45) Date of Patent: Aug. 17, 2010

(54) WINDING DRUM FOR SHEET-LIKE MEMBER

(75) Inventors: Toshio Tanaka, Hiratsuka (JP); Youichi Kikuchi, Hiratsuka (JP); Haruhisa Hasegawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 555 days.

(21) Appl. No.: 11/792,447

(22) Filed: Jun. 6, 2007

(65) Prior Publication Data
US 2009/0289143 A1 Nov. 26, 2009

(30) Foreign Application Priority Data
Feb. 22, 2006 (JP) .............................. 2006-044794

(51) Int. Cl.
*B65H 19/28* (2006.01)
(52) U.S. Cl. ............................... 242/532.2; 242/615.11
(58) Field of Classification Search ................ 242/581, 242/572, 532.2, 332.3, 571.6, 615.11–615.12
See application file for complete search history.

(56) References Cited

U.S. PATENT DOCUMENTS

| | | | | |
|---|---|---|---|---|
| 3,869,095 | A * | 3/1975 | Diltz ........................... | 242/531 |
| 6,401,787 | B1 * | 6/2002 | Tsutsumi et al. ............. | 156/542 |
| 6,427,941 | B1 * | 8/2002 | Hikita .................... | 242/615.12 |
| 6,652,687 | B2 * | 11/2003 | Shiraishi ...................... | 156/64 |
| 7,073,747 | B2 * | 7/2006 | Weis ........................ | 242/615.1 |
| 7,100,864 | B2 * | 9/2006 | Weis ...................... | 242/615.12 |
| 2002/0043322 | A1 * | 4/2002 | Shiraishi ...................... | 156/64 |

FOREIGN PATENT DOCUMENTS

| | | |
|---|---|---|
| JP | 5-24343 | 3/1993 |
| JP | 07-001603 | 1/1995 |
| JP | 2001-315219 | 11/2001 |
| JP | 2002-104351 | 4/2002 |
| JP | 2003-154580 | 5/2003 |
| JP | 2005-041168 | 2/2005 |
| WO | WO 2005/082609 | 9/2005 |

* cited by examiner

*Primary Examiner*—Sang Kim
(74) *Attorney, Agent, or Firm*—Greer, Burns & Crain, Ltd.

(57) ABSTRACT

The object of the present invention is to provide a winding drum for a sheet-like member which can change reliably the range of air sucking intake holes by a simple structure, and to provide a winding drum which can prevent the generation of an unwanted contact mark on the sheet-like member. This winding drum having a hollow portion which is in communication with the intake holes of the drum body, a changeover member which is releasably attached in the hollow portion and which is formed so as to extend along the inner peripheral surface of the hollow portion, and an air passage (second communicating holes, first communicating hole, and hole) which is provided on the changeover member and which communicates intake holes of a predetermined range in the axial direction of the drum body with the suction device when the changeover member is attached in the hollow portion. So the range of air sucking intake holes is switched by changing the changeover member to another changeover member with another air passage.

7 Claims, 17 Drawing Sheets

WINDING DRUM FOR SHEET-LIKE MEMBER

TECHNICAL FIELD

The present invention relates to, for example, a molding drum that is wound a sheet-like member such as an inner liner member, a sidewall member, or a carcass member which is a component of a tire of a vehicle so as to be molded into a cylindrical shape, and relates to a transfer drum that is wound the sheet-like member which is transferred to the molding drum.

BACKGROUND ART

A commonly known process of manufacturing a tire of a vehicle winds plural types of sheet-like members around an outer peripheral surface of a molding drum to mold a cylindrical member constituting a part of an uncured tire. Also, in other case, when the sheet-like member is wound around the molding drum, the sheet-like member may be wound once around an outer peripheral surface of a transfer drum that is different from the molding drum and the sheet-like member of the transfer drum is wound around the molding drum. A plurality of intake holes for sucking the sheet-like member by sucking air are provided on the outer peripheral surface of each winding drum. The intake holes steadily hold the sheet-like member around the outer peripheral surface of the winding drum. The range of intake holes which suck air can be changed so that air will not be uselessly sucked through intake holes that do not suck the sheet-like member.

A commonly known winding drum comprises a drum body formed in hollow shape, a plurality of intake holes provided all over an outer peripheral surface of the drumbody and in communication with the interior of the drum body, sucking means for sucking air in the drum body, two first adjusting plates arranged in the drum body so as to be movable in an axial direction of the drumbody, and second adjusting plate arranged in the drum body so as to be movable in a circumferential direction of the drum body. The air between first adjusting plates is sucked by the sucking means. The second adjusting plate closes the intake holes at arbitrary positions in the circumferential direction.

Another commonly known winding drum comprises a drum body having a plurality of drum members arranged in the circumferential direction, a plurality of intake holes provided in one of the drum members and arranged in the axial direction of the drum body, sucking means that is in communication with the intake holes, and on-off valves which are able to open and close each of the intake hole respectively. Each of the on-off valves has a valve body urged toward the exterior of the drum body by a spring. The valve body partly projects outward from the outer peripheral surface of the drum body. If the sheet-like member abuts against the valve body, the valve body will move toward the interior of the drum body against the urging force of the spring. Movement of the valve body toward the interior of the drum body opens the intake hole.

However, to change the range of air sucking intake holes, the above former winding drum needs the moving mechanisms for moving adjusting plates respectively. The above latter winding drum needs the on-off valve provided at each intake hole. This complicates the structure of the winding drum and increases the manufacture cost of the winding drum.

Further, when a thin, soft sheet-like member such as an inner liner member is wound around the latter winding drum, the urging force urging the valve body toward the exterior of the winding drum may result in an unwanted contact mark on the sheet-like member.

Patent Document 1: Japanese Patent Publication 2003-154580

Patent Document 2: Japanese Patent Publication 5-24343

DISCLOSURE OF THE INVENTION

An object of the present invention is to provide a winding drum for a sheet-like member which can change reliably the range of air sucking intake holes by a simple structure, and to provide a winding drum which can prevent the generation of an unwanted contact mark on the sheet-like member.

In order to achieve the above object, in the present invention, a winding drum for a sheet-like member is provided with a drum body having an outer peripheral surface around which the sheet-like member can be wound, a plurality of intake holes provided on the outer peripheral surface of the drum body at a predetermined position in the circumferential direction of the drum body, the intake holes being arranged in the axial direction of the drum body, a sucking means for sucking air through the intake holes so that the intake holes suck the sheet-like member when the sheet-like member is wound around the outer peripheral surface of the drum body, a hollow portion provided in the drum body so as to extend along the intake holes in the axial direction of the drum body, the hollow portion being communicated with each of the intake holes, a changeover member formed so as to extend along the hollow portion, the changeover member having an outer peripheral surface formed so as to extend along an inner peripheral surface of the hollow portion, the changeover member being releasably attached in the hollow portion, and an air passage provided in the changeover member, the air passage for communicating intake holes of a predetermined range in the axial direction of the drum body with the sucking means.

By this, the hollow portion that is in communication with each intake hole and the changeover member releasably attached in the hollow portion and the changeover member formed so as to extend along the inner peripheral surface of the hollow portion. The changeover member is provided with the air passage that communicates intake holes of said predetermined range with the sucking means. Thus, the range of air sucking intake holes is changed by replacing the changeover member to another changeover member with an air passage that communicates intake holes of another range in the axial direction of the drum body with the sucking means. Consequently, the range of air sucking intake holes is reliably changed by the simple structure, so it is very advantageous for reducing the manufacture cost of the drum body. Further, the changeover members are attached in the hollow portion, so the changeover member does not project outward from the drum body through the intake holes. Thus, for example, when a thin, soft sheet-like member such as an inner liner member is wound around the drum body, no unwanted contact mark is created on the sheet-like member. This makes it possible to improve the quality of the tire.

Also, in the present invention, a winding drum for a sheet-like member is provided with a drum body having an outer peripheral surface around which the sheet-like member can be wound, a plurality of intake holes provided on the outer peripheral surface of the drum body at a predetermined position in the circumferential direction of the drum body, the intake holes being arranged in the axial direction of the drum body, a sucking means for sucking air through the intake holes so that the intake holes suck the sheet-like member when the sheet-like member is wound around the outer peripheral surface of the drum body, a hollow portion provided in the drum body so as to extend along the intake holes in the axial direction of the drum body, the hollow portion being communicated with each of the intake holes, a changeover member formed so as to extend along the hollow portion, the changeover member having an outer peripheral surface formed so as to extend along an inner peripheral surface of the hollow portion, the changeover member being rotatably provided in the hollow portion, and an air passage provided on the changeover member, the air passage which communicates intake holes of a predetermined range in the axial direction of the drum body with the sucking means when the changeover member is placed at a predetermined position in the rotating direction of the changeover member, the air passage which communicates intake holes of another predetermined range in the axial direction of the drum body with the sucking means when the changeover member is placed at another predetermined position in the rotating direction of the changeover member.

By this, the hollow portion is in communication with each intake hole, the changeover member is rotatably provided in the hollow portion, and the changeover member is formed so as to extend along the inner peripheral surface of the hollow portion. The changeover member is provided with the air passage. When the changeover member is placed at said predetermined position in a rotating direction, intake holes of said predetermined range communicate with the sucking means via the air passage. When the changeover member is placed at another predetermined position in the rotating direction, intake holes of said another predetermined range communicate with the sucking means via the air passage. By this, Rotation of the changeover member changes the range of air sucking intake holes. Consequently, the range of air sucking intake holes is reliably changed by the simple structure, so it is very advantageous for reducing the manufacture cost of the drum body. Further, the changeover member is provided in the hollow portion, so the changeover member does not project outward from the drum body through the intake holes. Thus, for example, when a thin, soft sheet-like member such as an inner liner member is wound around the drum body, no unwanted contact mark is created on the sheet-like member. This makes it possible to improve the quality of the tire.

Also, in the present invention, a winding drum for a sheet-like member is provided with a drum body having an outer peripheral surface around which the sheet-like member can be wound, a plurality of intake holes provided on the outer peripheral surface of the drum body at a predetermined position in the circumferential direction of the drum body, the intake holes being arranged in the axial direction of the drum body, a sucking means for sucking air through the intake holes so that the intake holes suck the sheet-like member when the sheet-like member is wound around the outer peripheral surface of the drum body, a hollow portion provided in the drum body so as to extend along the intake holes in the axial direction of the drum body, the hollow portion being communicated with each of the intake holes, a changeover member formed so as to extend along the hollow portion, the changeover member having an outer peripheral surface formed so as to extend along an inner peripheral surface of the hollow portion, the changeover member being releasably attached in the hollow portion, a first communicating hole provided on the changeover member so as to extend in the axial direction of the drum body, the first communicating hole which is communicable with the sucking means, a plurality of second communicating holes provided on the changeover member, each of the second communicating hole for communicating each of the intake hole with the first communicating hole respectively, and a plurality of opening and closing members provided on the changeover member, each of the opening and closing member for opening and closing each of the second communicating hole respectively.

By this, the hollow portion is in communication with each intake hole, the changeover member is releasably attached in the hollow portion, and the changeover member is formed so as to extend along the inner peripheral surface of the hollow portion. Further, the changeover member has the first communicating hole which is formed in the changeover member so as to extend in the axial direction of the drum body and which is communicable with the sucking means, and the changeover member has the second communicating holes for communicating each of the intake holes with the first communicating hole respectively, and the opening and closing members for opening and closing each of the second communicating hole respectively. Thus, when the second communicating holes are opened or closed by each of the opening and closing member, the range of air sucking intake holes is reliably changed. Consequently, the range of air sucking intake holes is reliably changed by the simple structure, so it is very advantageous for reducing the manufacture cost of the drum body. Further, the changeover member is provided in the hollow portion, so the changeover member does not project outward from the drum body through the intake holes. Thus, for example, when a thin, soft sheet-like member such as an inner liner member is wound around the drum body, no unwanted contact mark is created on the sheet-like member. This makes it possible to improve the quality of the tire.

The above and other objects, features, and advantages of the present invention will become more apparent from the following description and the accompanying drawings.

DESCRIPTION OF SYMBOLS

1 . . . drum body, 10 . . . first drum member, 11 . . . second drum member, 11a . . . hole, 13 . . . hollow portion, 20 . . . changeover member, 20b . . . first communicating hole, 20c . . . hole, 20d . . . second communicating hole, 20f . . . elastic member, 21 . . . changeover member, 21b . . . first communicating member, 21c . . . hole, 21d . . . second communicating hole, 22 . . . changeover member, 22b . . . first communicating hole, 22c . . . hole, 22d . . . second communicating hole, 23 . . . changeover member, 23a . . . groove portion, 23b . . . groove portion, 24 . . . changeover member, 24a . . . smaller-diameter portion, 24b . . . concave portion, 30 . . . suction device, 40 . . . changeover member, 40b . . . first communicating hole, 40c . . . hole, 40d . . . first hole, 40e . . . second hole, 40f . . . elastic member, 41 . . . changeover member, 41a . . . first groove, 41b . . . second groove, 50 . . . hollow portion, 51 . . . changeover member, 51b . . . first communicating hole, 51c . . . hole, 51d . . . first hole, 51e . . . second hole, 60 . . . changeover member, 60b . . . first communicating hole, 60c . . . hole, 60d . . . fitting groove, 60e . . . second communicating hole, 60f . . . ring-shaped member, 60h . . . elastic member, H1 to H12 . . . intake hole, SE . . . sheet-like member

BEST MODE FOR CARRYING OUT THE INVENTION

Figure 1:
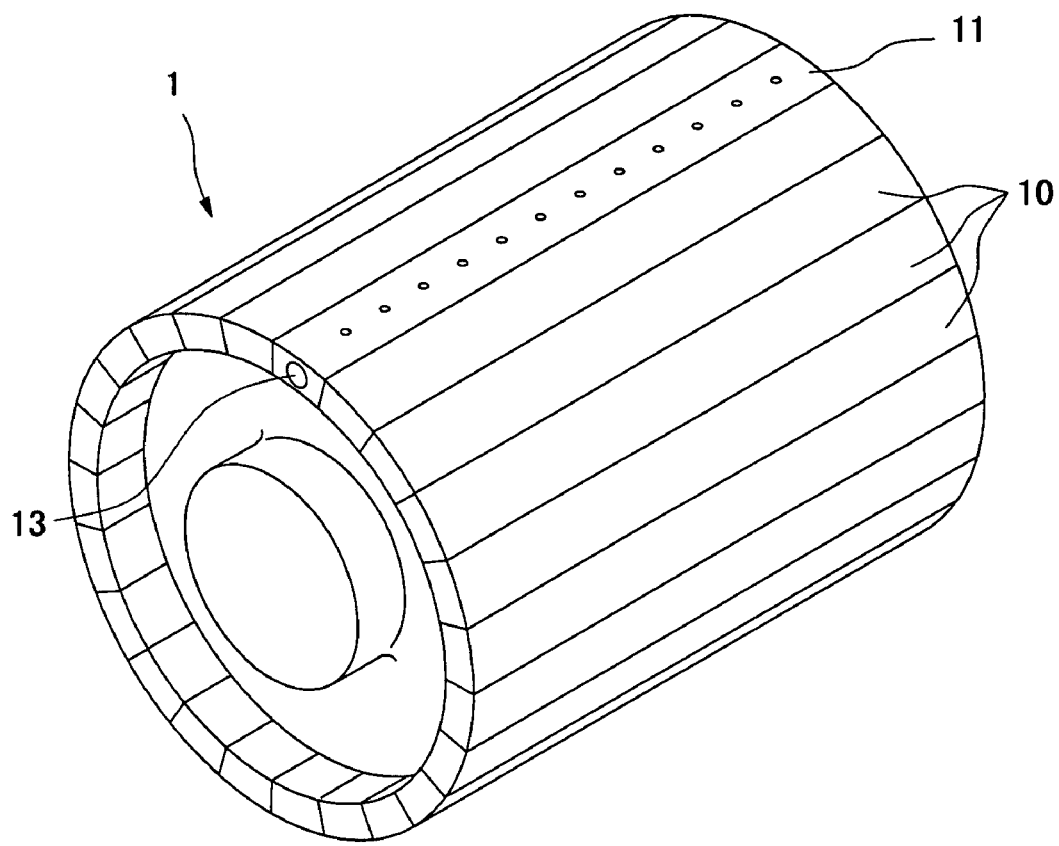
FIG. 1 is a perspective view of a drum body showing a first embodiment of the present invention.
Figure 2:
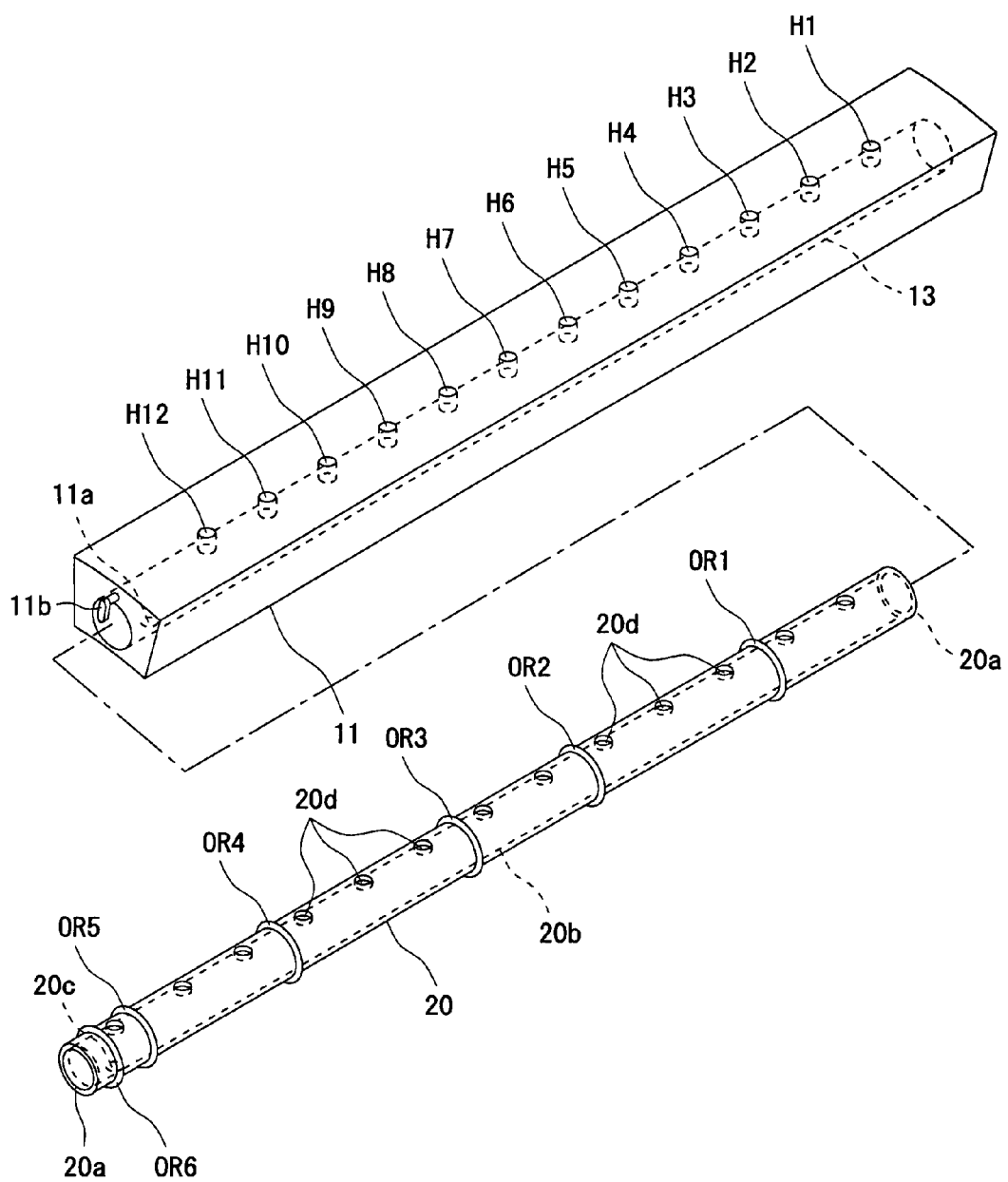
FIG. 2 is a perspective view of a second drum member into which a changeover member has not been inserted yet.
Figure 3:
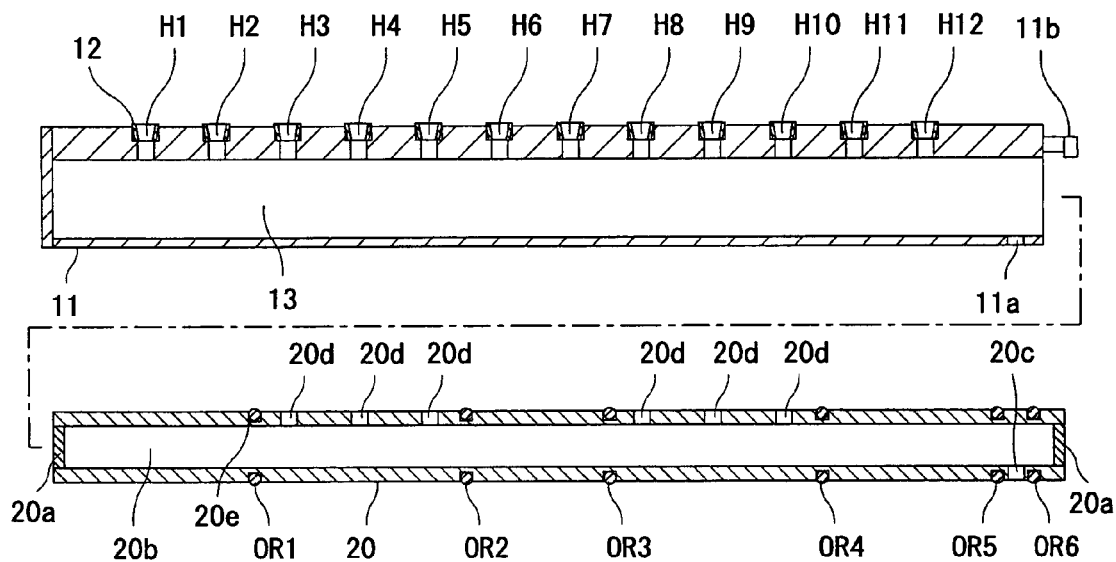
FIG. 3 is a side sectional view of the second drum member into which the changeover member has not been inserted yet.
Figure 4:
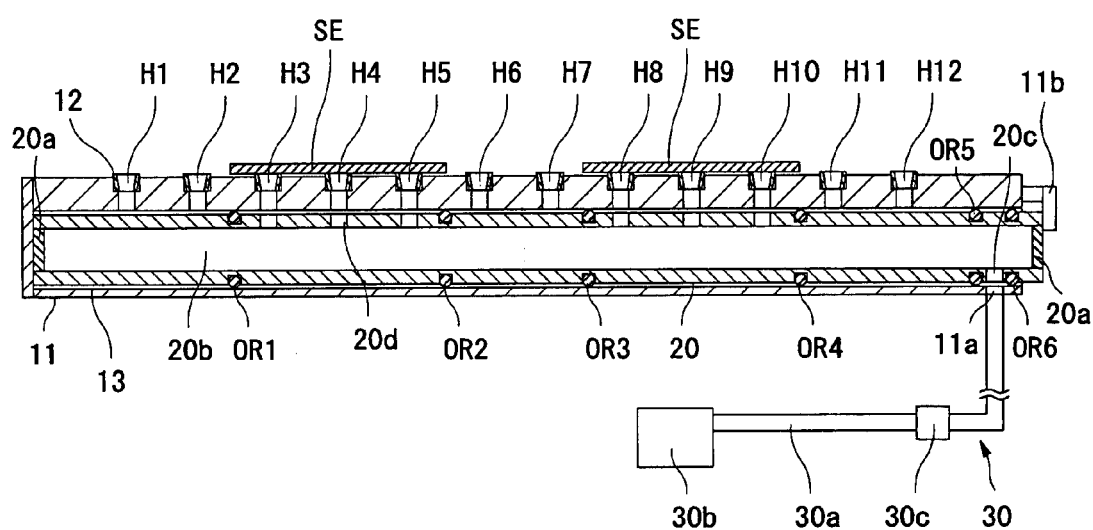
FIG. 4 is a side sectional view of the second drum member into which the changeover member has been inserted.
Figure 5:
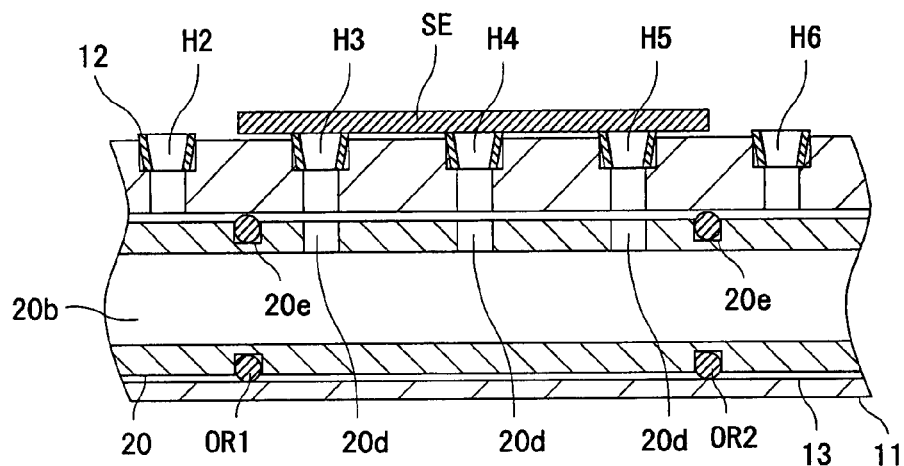
FIG. 5 is a side sectional view showing an essential part of the second drum member into which the changeover member has been inserted.
Figure 6:
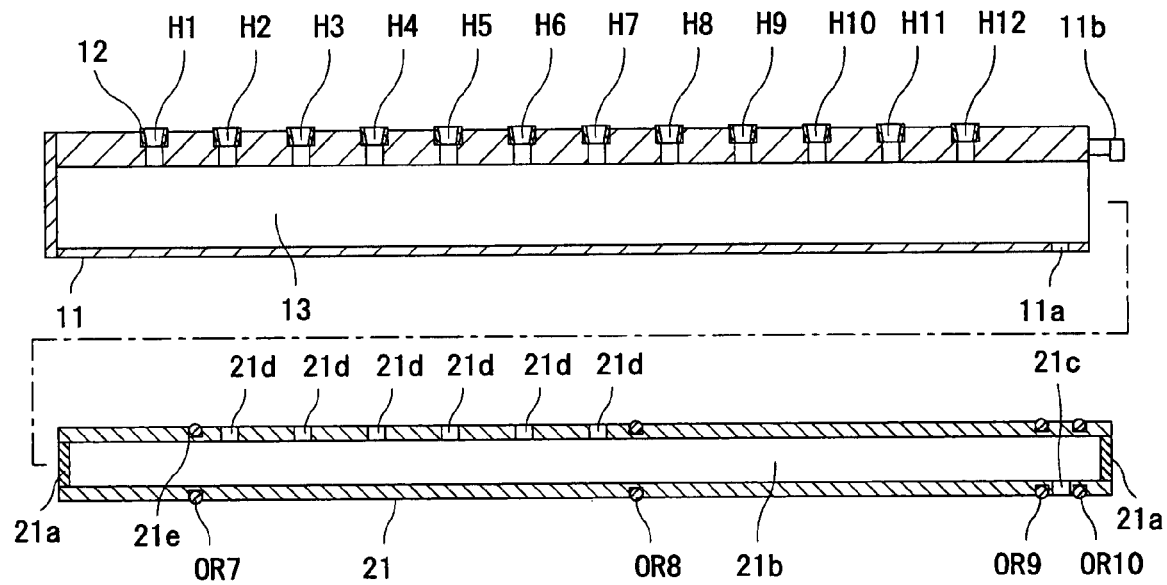
FIG. 6 is a side sectional view of the second drum member into which another changeover member has not been inserted yet.
Figure 7:
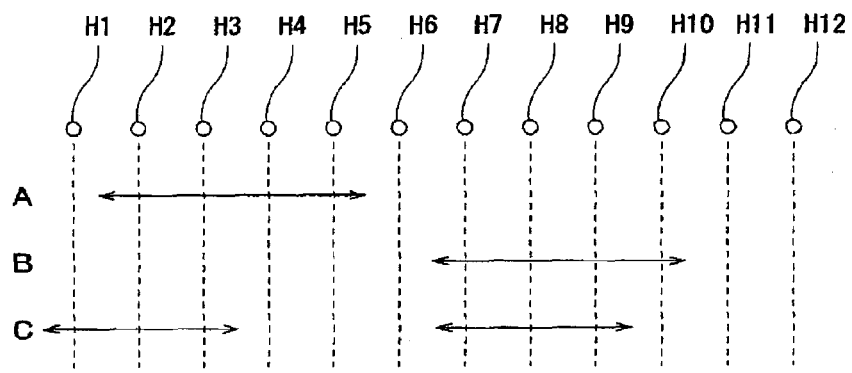
FIG. 7 is a diagram showing the relationship between the position of each intake hole and a winding position of a sheet-like member.

FIGS. 1 to 7 show a first embodiment of the present invention. FIG. 1 is a perspective view of a drum body showing a first embodiment of the present invention, FIG. 2 is a perspective view of a second drum member into which a changeover member has not been inserted yet, FIG. 3 is a side sectional view of the second drum member into which the changeover member has not been inserted yet, FIG. 4 is a side sectional view of the second drum member into which the changeover member has been inserted, FIG. 5 is a side sectional view showing an essential part of the second drum member into which the changeover member has been inserted, FIG. 6 is a side sectional view of the second drum member into which another changeover member has not been inserted yet, FIG. 7 is a diagram showing the relationship between the position of each intake hole and a winding position of a sheet-like member.

A winding drum for a sheet-like member comprises a plurality of first drum members 10 arranged at intervals from each other in a circumferential direction of a drum body 1, a second drum member 11 arranged with the first drum members 10 in a circumferential direction, a plurality of (in the present embodiment, 12) intake holes H1 to H12 provided in the second drum member 11, a hollow portion 13 formed in the second drum member 11 so as to extend in an axial direction of the drum body 1, and a changeover member 20 releasably inserted into the hollow portion 13. A sheet-like member SH wound around the winding drum is an uncured rubber sheet constituting the tire such as an inner liner member, a sidewall member, a carcass member, a belt member, or a tread member, or any other flexible sheet.

The first drum members 10 and the second drum member 11 are supported by a well-known supporting mechanism and the drum members 10 and 11 are movable in a radial direction of the drum body 1. An outer peripheral surface of the drum body 1 is formed of the first drum members 10 and second drum member 11.

The intake holes H1 to H12 are arrayed in one row in the axial direction of the drum body 1 and the intake holes are in communication with the hollow portion 13. The openings of the intake holes H1 to H12 which are opening into the hollow portion 13 are arrayed in one row in the axial direction of the drum body 1. A sucking member 12 is fixed to the one side of each of the intake holes H1 to H12, said one side is the outer peripheral surface side of the drum body 1 in each of the intake holes H1 to H12. Each sucking member 12 is a cylindrical elastic member, and the one side of the sucking member 12 is enlarged, said one side is outer peripheral surface side. The sucking member 12 projects slightly from the outer peripheral surface of the drum body 1.

The hollow portion 13 is a circular hole extending in the axial direction of the drum body 1 and is provided along the intake holes H1 to H12. The hollow portion 13 is in communication with each of the intake holes H1 to H12 and is open in one end surface of the second drum member 11. A hole 11a is formed at the one end side of the second drum member 11, and the one end of the hole 11a open into the hollow portion 13. The other end of the hole 11a is connected to a suction device 30 having a well-known suction pipe 30a and a well-known compressor 30b. The suction pipe 30a has a rotary joint 30c provided in middle of the suction pipe, and the rotary joint 30c is attached to a spindle (not shown) of the drum body 1.

The changeover member 20 is a tubular member with a circular cross section, and an outer peripheral surface of the changeover member 20 has a slightly smaller diameter than that of the inner peripheral surface of the hollow portion 13. Both ends of the changeover member 20 are closed by end surface members 20a. A first communicating hole 20b is formed in the changeover member 20. The changeover member 20 is slightly longer than the hollow portion 13 in the axial direction of the drum body 1. Thus, insertion of the changeover member 20 into the hollow portion 13 causes the one end of the changeover member 20 to project from the hollow portion 13. A hole 20c is formed at one end of the changeover member 20 so as to penetrate the changeover member 20 in a radial direction. The hole 20c is provided at a position corresponding to the hole 11a of the second drum member 11. Thus, insertion of the changeover member 20 into the hollow portion 13 aligns the hole 20c of the changeover member 20 with the hole 11a of the second drum member 11. By this, the first communicating hole 20b of the changeover member 20 communicates with the suction device 30. The changeover member 20 is provided with six second communicating holes 20d each penetrating the changeover member 20 in the radial direction. The second communicating holes 20d are provided at positions corresponding to the intake holes H3, H4, H5, H8, H9, and H10 of the second drum member 11. Thus, insertion of the changeover member 20 into the hollow portion 13 aligns the second communicating holes 20d of the changeover member 20 with the intake holes H3, H4, H5, H8, H9, and H10. By this, the intake holes H3, H4, H5, H8, H9, and H10 communicates with the first communicating holes 20b in the changeover member 20. Therefore, when the suction device 30 begin to work, the suction holes H3, H4, H5, H8, H9, and H10 suck air.

A stopper 11b is provided on the one end surface of the second drum member 11. After the changeover member 20 is inserted into the hollow portion 13, the stopper 11b is rotated to a predetermined position, the stopper 11b abuts against the one end of the changeover member 20. Thus, the changeover member 20 is held in the hollow portion 13 by the stopper 11b.

Six O rings OR1 to OR6 as annular elastic members are provided in an outer peripheral surface of the changeover member 20. The O rings OR1 to OR6 consist of a well-known rubber material. The O rings OR1 to OR6 are arranged respectively in each of the groove 20e formed in the outer peripheral surface of the changeover member 20. The grooves 20e extend in a circumferential direction of the changeover member 20. An outer peripheral surface of each of the O rings OR1 to OR6 projects slightly from the outer peripheral surface of the changeover member 20 in the radial direction. The O ring OR1 is positioned between the intake holes H2 and H3. The O ring OR2 is positioned between the intake holes H5 and H6. The O ring OR3 is positioned between the intake holes H7 and H8. The O ring OR4 is positioned between the intake holes H10 and H11. The O rings OR5 and OR6 are arranged at one end side of the changeover member 20, and the hole 20c located between the O rings OR5 and OR6.

When the changeover member 20 is inserted into the hollow portion 13, each of the O rings OR1 to OR6 partition respectively the gap between the outer peripheral surface of the changeover member 20 and the inner peripheral surface of the hollow portion 13 in the axial direction of the drum body 1. Thus, when the intake holes H3, H4, H5, H8, H9, and H10 suck air by the actuation of the suction device 30, the gap between the outer peripheral surface of the changeover member 20 and the inner peripheral surface of the hollow portion 13 is sealed so as to inhibit suction of air through intake holes other than H3, H4, H5, H8, H9, and H10.

In the description below, a pair of sheet-like members SE is wound around the outer peripheral surface of the drum body 1 of the above winding drum. First, the changeover member 20 is inserted into the hollow portion 13. The stopper 11b holds the changeover member 20 in the hollow portion 13. By this, the intake holes H3, H4, H5, H8, H9, and H10 communicate with the suction device 30. Then, when the sheet-like members SE are wound around the outer peripheral surface of the drum body 1, the intake holes H3, H4, H5, H8, H9, and H10 suck air by the actuation of the suction device 30.

By this, the intake holes H3, H4, H5, H8, H9, and H10 suck the sheet-like members SE, and the sheet-like member are wound around the outer peripheral surface of the drum body 1. The intake holes H3, H4, H5, H8, H9, and H10 are provided with the sucking members 12, so the intake holes H3, H4, H5, H8, H9, and H10 reliably suck the sheet-like members SE.

On the other hand, to wind the sheet-like members SE which have a different width around the drum body 1 or to change the positions at which the sheet-like members SE are wound, the changeover member 20 is changed to, for example, another changeover member 21. The changeover member 21 is provided with an end surface member 21a, a first communicating hole 21b, a hole 21c, grooves 21e, a plurality of O rings OR7 to OR10, and six second communicating holes 21d all of which are equivalent to those of the changeover member 20. The second communicating holes 21d are formed at positions corresponding to the intake holes H2, H3, H4, H5, H6, and H7 in the second drum member 11. This enables the sheet-like members SE to be wound at positions corresponding to the intake holes H2, H3, H4, H5, H6, and H7.

Thus, provision of plural types of changeover members enables the range of air sucking intake holes H1 to H12 to be arbitrarily changed. FIG. 7 shows, for example, the relationship between the positions of the intake holes H1 to H12 and the winding positions of the sheet-like members SE. To wind the sheet-like member SE at a position A, air is sucked through the intake holes H2, H3, H4, and H5. To wind the sheet-like member SE at a position B, air is sucked through the intake holes H7, H8, H9, and H10. To wind the sheet-like member SE at a position C, air is sucked through the intake holes H1, H2, H3, H7, H8, and H9.

Thus, according to the present embodiment, the hollow portion 13 is in communication with the intake holes H1 to H12. The changeover member 20 is releasably attached in the hollow portion 13, and the changeover member 20 is formed so as to extend along the inner peripheral surface of the hollow portion 13. The changeover member 20 is provided with an air passage (second communicating holes 20d, first communicating hole 20b, and hole 20c) through which a predetermined range of intake holes H3, H4, H5, H8, H9, and H10 in the axial direction of the drum body 1 are in communication with the suction device 30. By this, the range of air sucking intake holes is switched by changing the changeover member 20 to the changeover member 21, which allows another predetermined range of intake holes H2 to H7 in the axial direction to communicate with the suction device 30. Consequently, the range of air sucking intake holes is changed by the simple structure, so it is very advantageous for reducing the manufacture cost of the drum body 1.

The O rings OR1 to OR6 are provided between the outer peripheral surface of the changeover member 20 and the inner peripheral surface of the hollow portion 13. Thus, when the suction device 30 sucks air through the intake holes H3, H4, H5, H8, H9, and H10, the gap between the outer peripheral surface of the changeover member 20 and the inner peripheral surface of the hollow portion 13 is sealed so as to inhibit suction of air through the intake holes other than H3, H4, H5, H8, H9, and H10. Consequently, the range of air sucking intake holes is reliably changed.

The changeover member 20 is arranged in the hollow portion 13, so the changeover member 20 does not project outward from the drum body 1 through the intake holes H1 to H12. Thus, for example, when a thin, soft sheet-like member SE such as an inner liner member is wound around the drum body 1, no unwanted contact mark is created on the sheet-like member SE. This makes it possible to improve the quality of the tire.

The air passage for communicating the intake holes H3, H4, H5, H8, H9, and H10 with the suction device 30 has the first communicating hole 20b which is provided in the changeover member 20 so as to extend in the axial direction of the drum body 1 and which is communicable with the suction device 30, and the plurality of second communicating holes 20d which are provided in the changeover member 20 and which communicates the predetermined range of intake holes H3, H4, H5, H8, H9, and H10 in the axial direction with the first communicating hole 20b. Consequently, the air passage has a simple structure, so it is very advantageous for reducing the manufacture cost.

The O rings OR1 to OR6, attached to the changeover member 20, seal the gap between the outer peripheral surface of the changeover member 20 and the inner peripheral surface of the hollow portion 13. By this, the gap between the outer peripheral surface of the changeover member 20 and the inner peripheral surface of the hollow portion 13 is reliably sealed by the simple structure.

Figure 8:
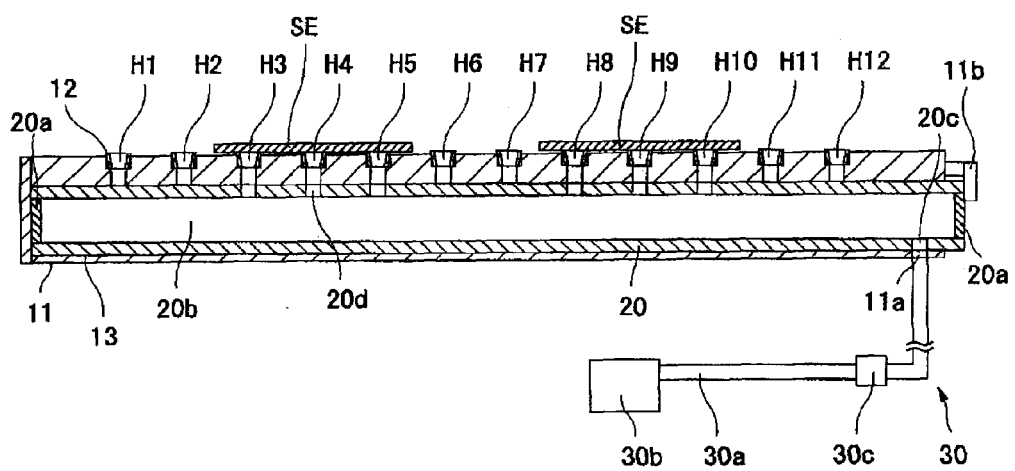
FIG. 8 is a side sectional view of the second drum member showing a first variation of the changeover member of the first embodiment.

In the present embodiment, the O rings OR1 to OR6 are provided in the gap between the outer peripheral surface of the changeover member 20 and the inner peripheral surface of the hollow portion 13. However, it is possible to omit the O rings OR1 to OR6 by minimizing the size of the gap between the outer peripheral surface of the changeover member 20 and the inner peripheral surface of the hollow portion 13 (see FIG. 8).

Figure 9:
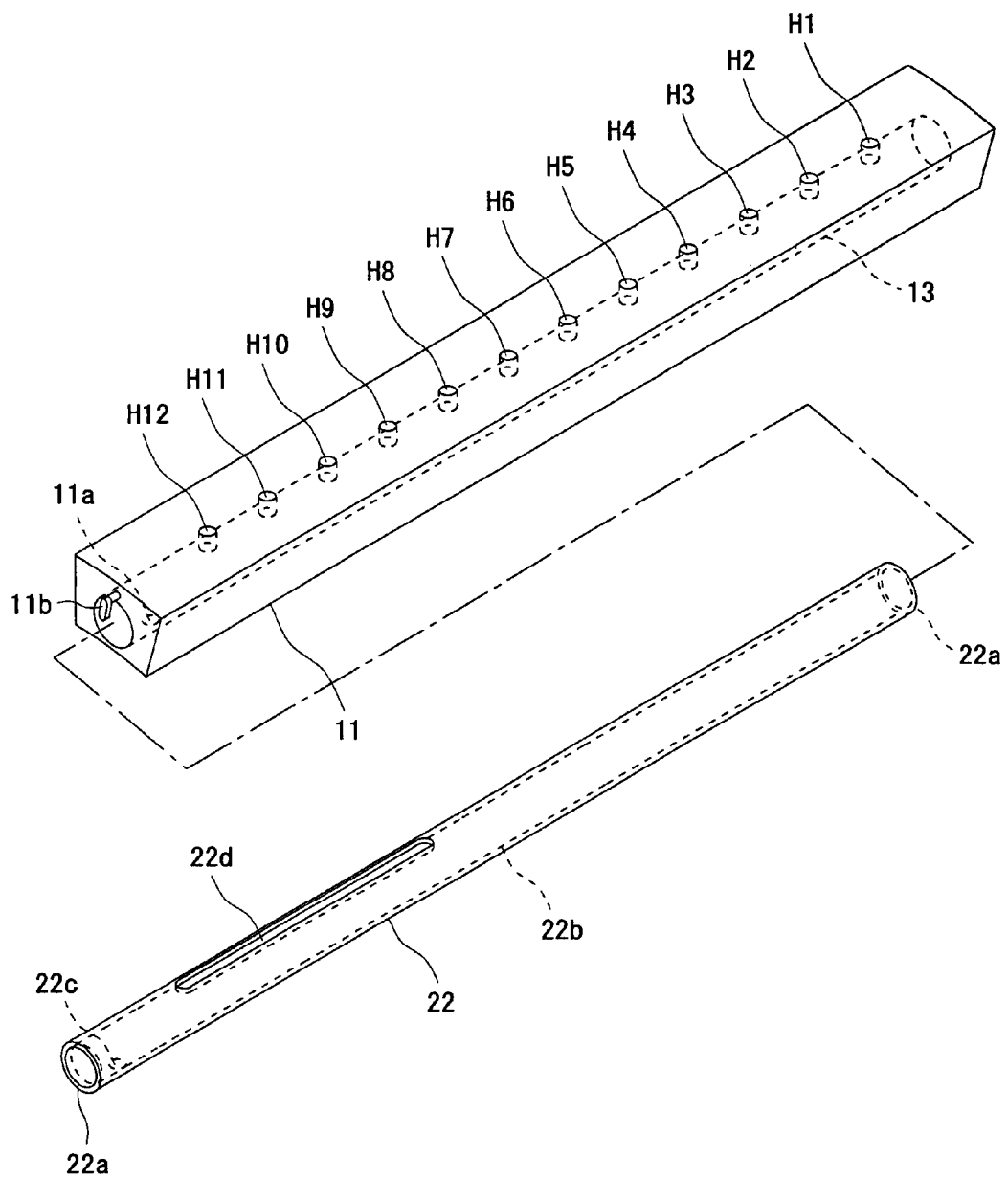
FIG. 9 is a perspective view of the second drum member showing a second variation of the changeover member of the first embodiment.

In the present embodiment, the changeover member 20 which communicates the intake holes H3, H4, H5, H8, H9, and H10 with the suction device 30 is provided. However, it is possible to provide a changeover member 22 which communicates, for example, the intake holes H8, H9, H10, H11, and H12 with the suction device 30 (see FIG. 9).

In this case, the changeover member 22 is a tubular member with a circular cross section and is releasably inserted into the hollow portion 13. An outer peripheral surface of the changeover member 22 has a slightly smaller diameter than that of the inner peripheral surface of the hollow portion 13. Both ends of the changeover member 22 are closed by end surface members 22a. A first communicating hole 22b is formed in the changeover member 22. A hole 22c is provided at one end side of the changeover member 22 so as to penetrate the changeover member 22 in a radial direction. The hole 22c is provided at a position corresponding to the hole 11a of the second drum member 11. A second communicating hole 22d is also provided in the changeover member 22 so as to penetrate the changeover member 22 in the radial direction. The second communicating hole 22d is elongated hole and which extends in the axial direction of the drum body 1. The second communicating hole 22d is provided at position corresponding to the intake holes H8, H9, H10, H11, and H12. Thus, insertion of the changeover member 22 into the hollow portion 13 allows the intake holes H8, H9, H10, H11, and H12 to communicate with second communicating hole 22d, while allowing the hole 22c to communicate with the hole 11a in the second drum member 11. Consequently, the intake holes H8, H9, H10, H11, and H12 suck air by the activation of the suction device 30.

Figure 10:
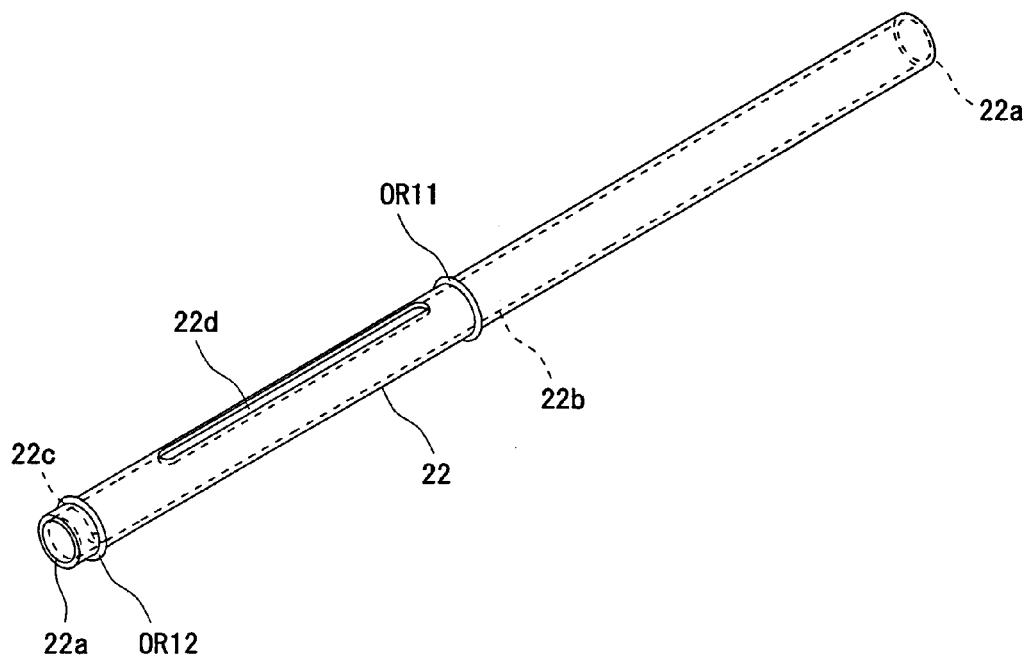
FIG. 10 is a perspective view of the second drum member showing a third variation of the changeover member of the first embodiment.

It is possible to provide two O rings OR11 and OR12 on the outer peripheral surface of the changeover member 22 (see FIG. 10). In this case, the O ring OR11 is located between the intake holes H7 and H8. The O ring OR12 is located closer to one end of the second drum member 11 than the hole 11a. By this, the gap between the outer peripheral surface of the changeover member 22 and the inner peripheral surface of the hollow portion 13 is sealed so as to inhibit suction of air through the intake holes other than H8, H9, H10, H11, and H12.

Figure 11:
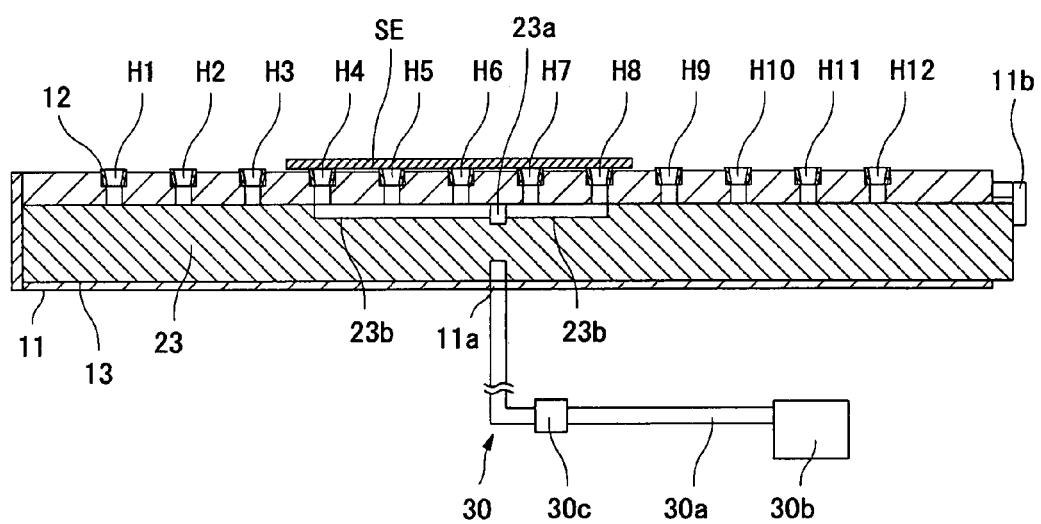
FIG. 11 is a side sectional view of the second drum member showing a fourth variation of the changeover member of the first embodiment.

In the present embodiment, the changeover member 20 which communicates the intake holes H3, H4, H5, H8, H9, and H10 with the suction device 30, is provided. However, It is possible to provide a changeover member 23 which communicates, for example, the intake holes H4, H5, H6, H7, and H8 with the suction device 30 (see FIG. 11).

In this case, the hole 11a in the second drum member 11 is formed between the intake holes H6 and H7. The changeover member 23 is a cylindrical member and is releasably inserted into the hollow portion 13. An outer peripheral surface of the changeover member 23 has a slightly smaller diameter than that of the inner peripheral surface of the hollow portion 13. A groove portion 23a is formed in an outer peripheral surface of the changeover member 23 so as to extend in the circumferential direction. The groove portion 23a is provided at a position corresponding to the hole 11a in the second drum member 11. A groove portion 23b is provided in the outer peripheral surface of the changeover member 23 so as to extend in the axial direction of the drum body 1. The groove portion 23b is in communication with the groove portion 23a. The groove portions 23a and 23b correspond to concave portion in the claims. The groove portion 23b is provided at a position corresponding to the intake holes H4, H5, H6, H7, and H8. Thus, insertion of the changeover member 23 into the hollow portion 13 allows the intake holes H4, H5, H6, H7, and, H8 to communicate with the groove portion 23a. The groove portion 23b also communicates with the hole 11a in the second drum member 11. Thus, the intake holes H4, H5, H6, H7, and H8 suck air by the activation of the suction device 30.

Figure 12:
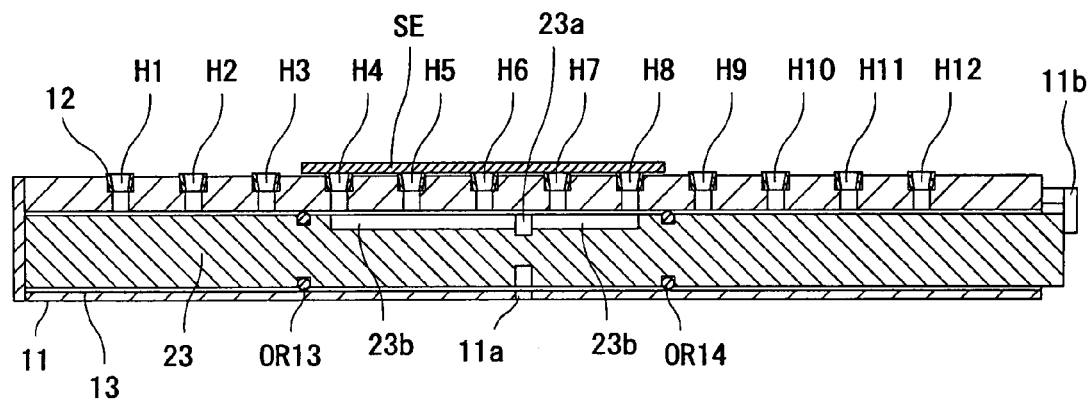
FIG. 12 is a side sectional view of the second drum member showing a fifth variation of the changeover member of the first embodiment.

It is possible to provide two O rings OR13 and OR14 on the outer peripheral surface of the changeover member 23 (see FIG. 12). In this case, the O ring OR13 is located between the intake holes H3 and H4. The O ring OR14 is located between the intake holes H8 and H9. By this, the gap between the outer peripheral surface of the changeover member 23 and the inner peripheral surface of the hollow portion 13 is sealed so as to inhibit suction of air through the intake holes other than H4, H5, H6, H7, and H8.

Figure 13:
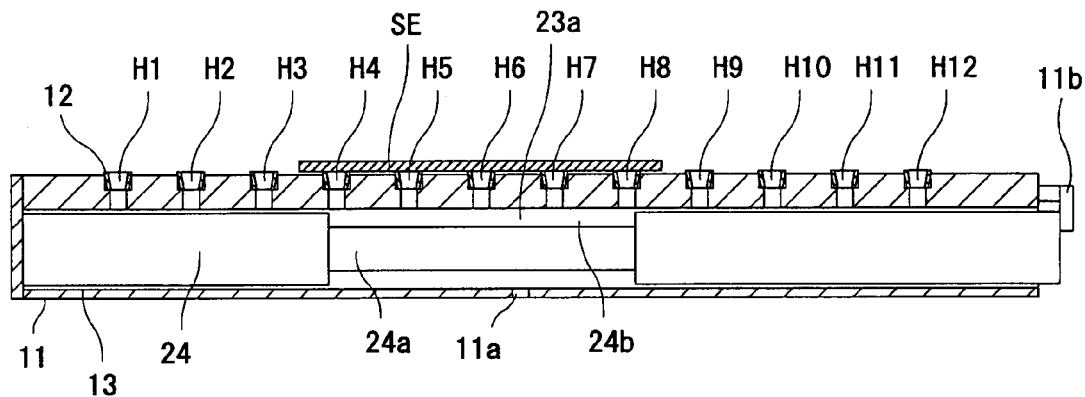
FIG. 13 is a side sectional view of the second drum member showing a sixth variation of the changeover member of the first embodiment.

In the present embodiment, the changeover member 20 which communicates the intake holes H3, H4, H5, H8, H9, and H10 with the suction device 30, is provided. However, It is possible to provide a changeover member 24 which communicates, for example, the intake holes H4, H5, H6, H7, and H8 with the suction device 30 (see FIG. 13).

In this case, the hole 11a in the second drum member 11 is provided between the intake holes H6 and H7. The changeover member 24 is a cylindrical member and is releasably inserted into the hollow portion 13. An outer peripheral surface of the changeover member 24 has a slightly smaller diameter than that of the inner peripheral surface of the hollow portion 13. The changeover member 24 has a smaller-diameter portion 24a formed in its central portion in the axial direction and having a smaller diameter than the other portions. A concave portion 24b is provided on an outer peripheral surface side of the smaller-diameter portion 24a. The concave portion 24b is provided at a position corresponding to the intake holes H4, H5, H6, H7, and H8. Thus, insertion of the changeover member 24 into the hollow portion 13 allows the intake holes H4, H5, H6, H7, and H8 to communicate with the concave portion 24b. The concave portion 24b also communicates with the hole 11a in the second drum member 11. Thus, the intake holes H4, H5, H6, H7, and H8 suck air by the activation of the suction device 30.

Figure 14:
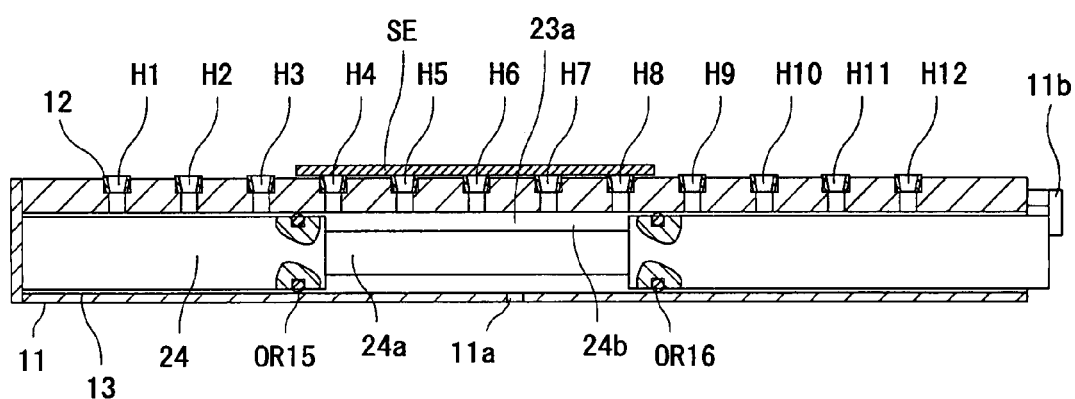
FIG. 14 is a side sectional view of the second drum member showing a seventh variation of the changeover member of the first embodiment.

It is possible to provide two O rings OR15 and OR16 on the outer peripheral surface of the changeover member 24 (see FIG. 14). In this case, the O ring OR15 is located between the intake holes H3 and H4. The O ring OR16 is located between the intake holes H8 and H9. By this, the gap between the outer peripheral surface of the changeover member 24 and the inner peripheral surface of the hollow portion 13 is sealed so as to inhibit suction of air through the intake holes other than H4, H5, H6, H7, and H8.

Figure 15:
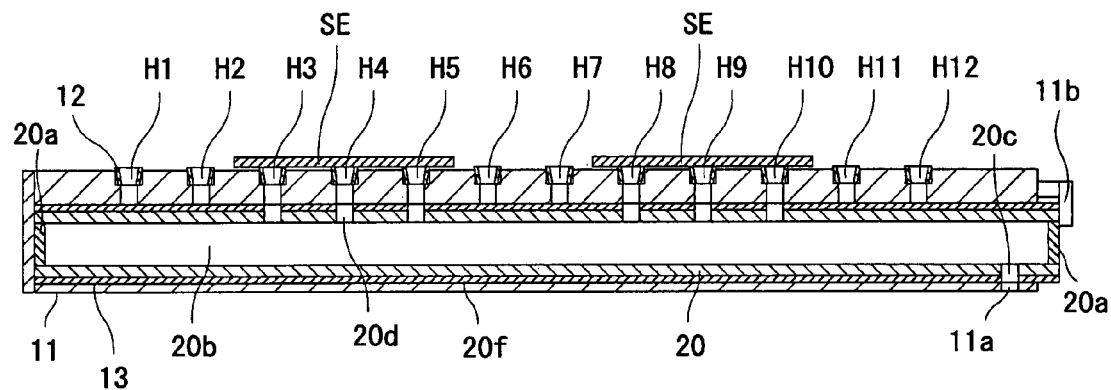
FIG. 15 is a side sectional view of the second drum member showing an eighth variation of the changeover member of the first embodiment.
Figure 16:
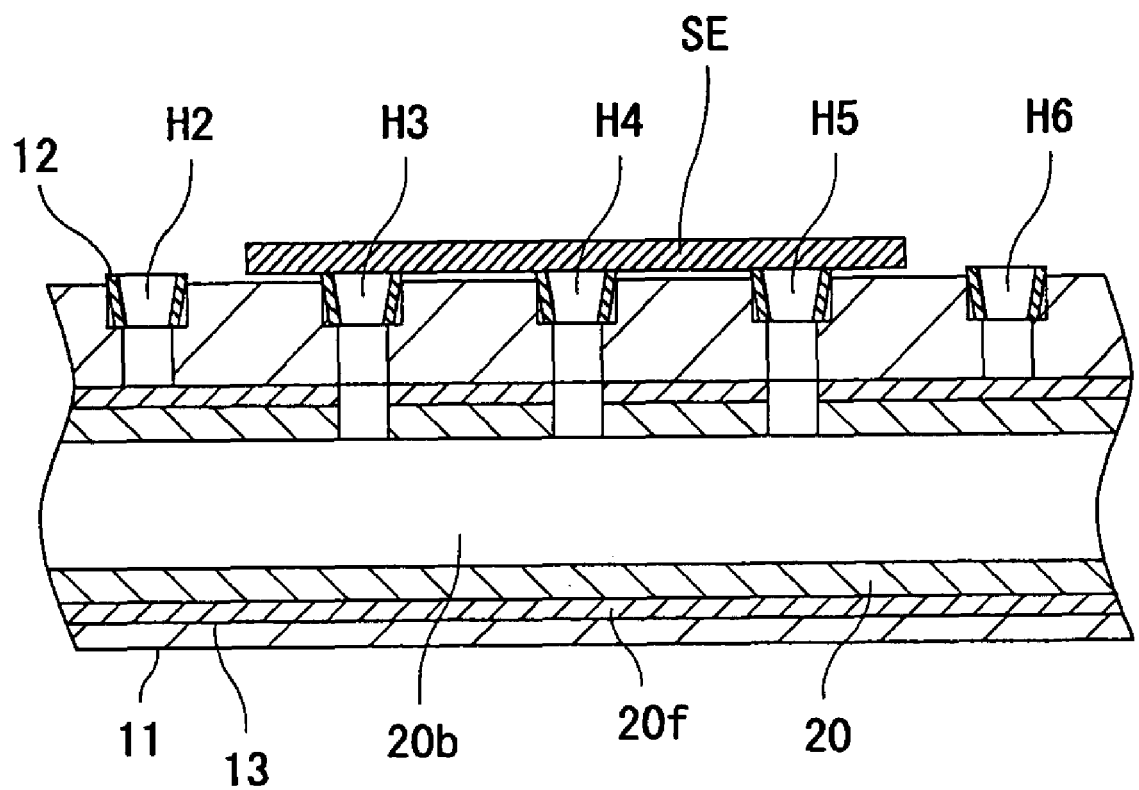
FIG. 16 is a side sectional view showing an essential part of the second drum member showing the eighth variation of the changeover member of the first embodiment.

In the present embodiment, the plurality of O rings OR1 to OR6 are provided on the outer peripheral surface of the changeover member 20. The O rings OR1 to OR6 seal the gap between the outer peripheral surface of the changeover member 20 and the inner peripheral surface of the hollow portion 13. However, it is possible to seal the gap between the outer peripheral surface of the changeover member 20 and the inner peripheral surface of the hollow portion 13 by an elastic member 20f which covers the changeover member 20 (see FIGS. 15 and 16). The elastic member consists of, for example, rubber.

In this case, the elastic member 20f covers the entire outer peripheral surface of the changeover member 20. The elastic member 20f is adhesively fixed to the outer peripheral surface of the changeover member 20. Thus, insertion of the changeover member 20 into the hollow portion 13 brings the elastic member 20f into contact with the inner peripheral surface of the hollow portion 13. By this, the gap between the outer peripheral surface of the changeover member 20 and the inner peripheral surface of the hollow portion 13 is sealed.

Figure 17:
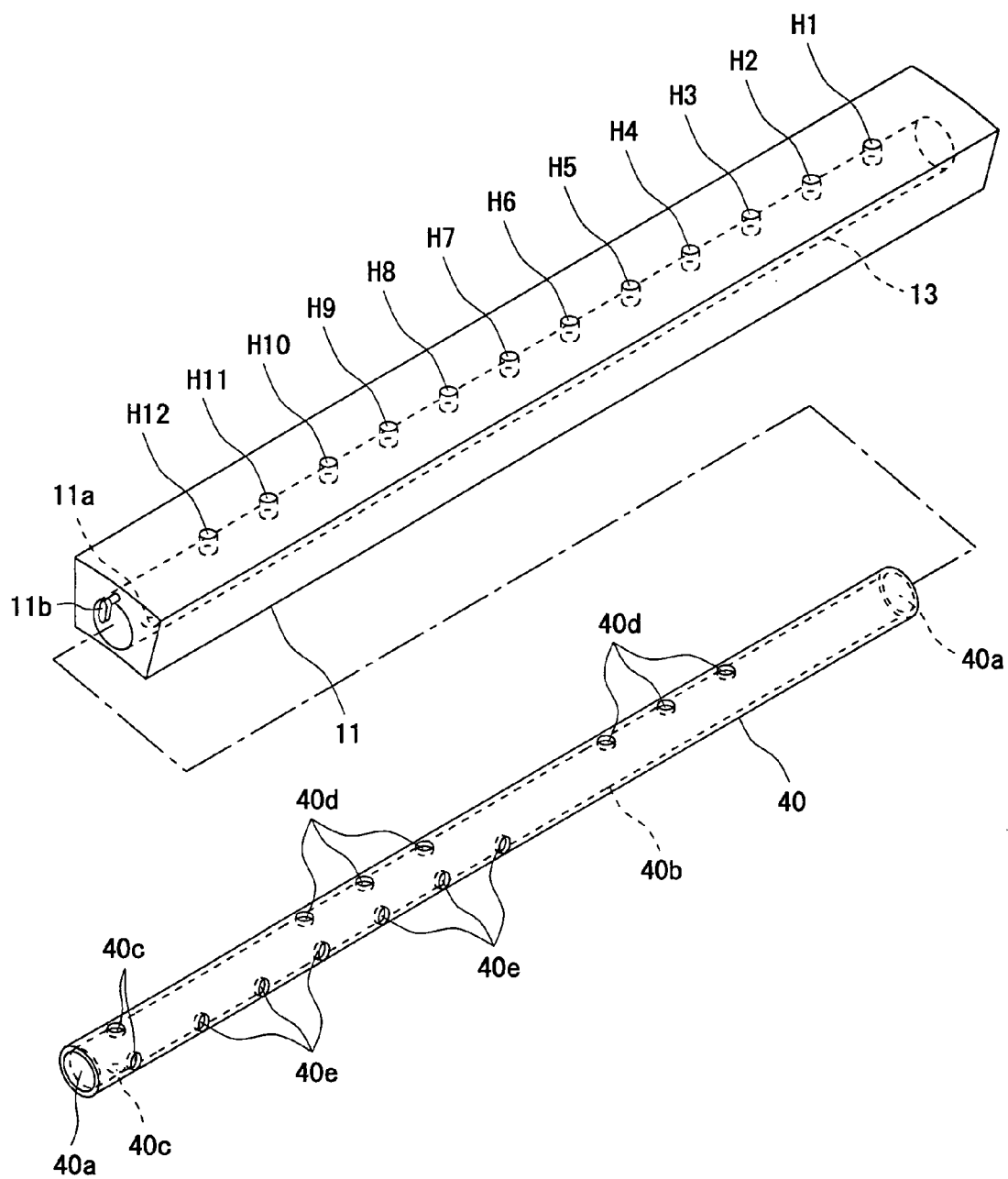
FIG. 17 is a perspective view of the second drum member into which the changeover member has not been inserted yet, showing a second embodiment of the present invention.
Figure 18:
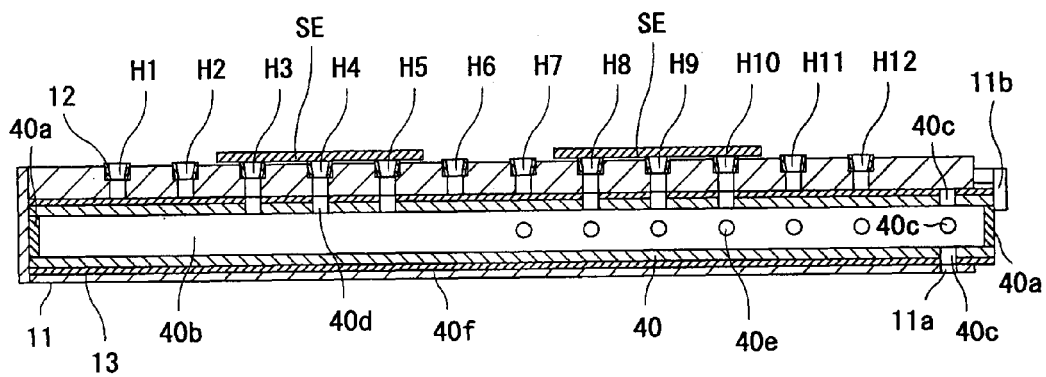
FIG. 18 is a side sectional view of the second drum member into which the changeover member has been inserted.
Figure 19:
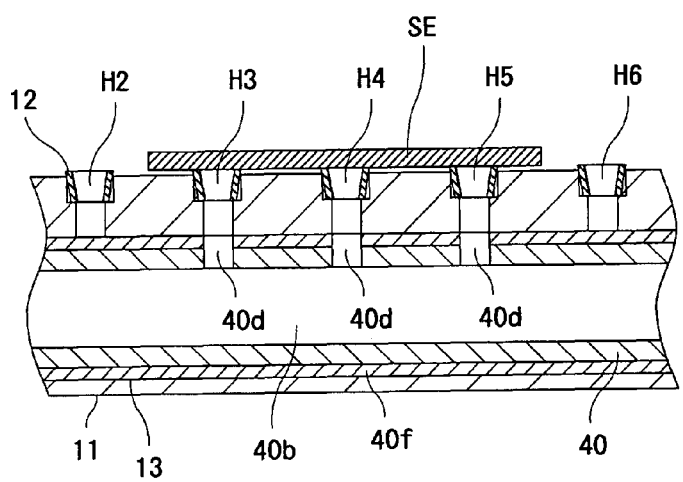
FIG. 19 is a side sectional view showing an essential part of the second drum member into which the changeover member has been inserted.

FIGS. 17 to 19 show a second embodiment of the present invention. FIG. 17 is a perspective view of the second drum member into which the changeover member has not been inserted yet, showing a second embodiment of the present invention, FIG. 18 is a side sectional view of the second drum member into which the changeover member has been inserted, FIG. 19 is a side sectional view showing an essential part of the second drum member into which the changeover member has been inserted. Components equivalent to those of the first embodiment are denoted by the same reference symbols.

This winding drum for a sheet-like member comprises the first drum members 10, the second drum member 11, the intake holes H1 to H12, the hollow portion 13, and the suction device 30, which are equivalent to those of the first embodiment, and a changeover member 40 rotatably inserted into the hollow portion 13.

The changeover member 40 is a tubular member with a circular cross section. Both ends of the changeover member 40 are closed by end surface members 40a. A first communicating hole 40b is formed in the changeover member 40. The changeover member 40 is slightly longer than the hollow portion 13 in the axial direction of the drum body 1. Thus, insertion of the changeover member 40 into the hollow portion 13 causes one end of the changeover member 40 to project from the hollow portion 13. A plurality of holes 40c are formed at one end side of the changeover member 40 so as to penetrate the changeover member 40 in the radial direction. The holes 40c are arranged at intervals from each other in the circumferential direction of the changeover member 40. The holes 40c are provided at an axial position corresponding to the hole 11a in the second drum member 11. Thus, insertion of the changeover member 40 into the hollow portion 13 aligns each hole 40c in the changeover member 40 with the hole 11a in the second drum member 11.

Six first holes 40d and four second holes 40e are provided in the changeover member 40 so as to penetrate the changeover member 40 in the radial direction. The first holes 40d are arrayed in one row in the axial direction of the drum body 1. The second holes 40e are arrayed in one row in the axial direction of the drum body 1. The first holes 40d is spaced from the second holes 40e in the circumferential direction of the changeover member 40. The first holes 40d are aligned with one of the holes 40c in the circumferential direction of the changeover member 40. The second holes 40e are aligned with one of the holes 40c in the circumferential direction of the changeover member 40. The first holes 40d are provided at positions corresponding to the intake holes H3, H4, H5, H8, H9, and H10 in the second drum member 11. The second holes 40e are provided at positions corresponding to the intake holes H7, H8, H9, H10, H11, and H12. Thus, when the changeover member 40 is inserted into the hollow portion 13 and placed at a predetermined position in a rotating direction, the first holes 40d align with the intake holes H3, H4, H5, H8, H9, and H10. By this, the intake holes H3, H4, H5, H8, H9, and H10 communicate with the first communicating hole 40b in the changeover member 40. Placing the changeover member 40 at another predetermined position in the rotating direction aligns the second holes 40e with the intake holes H7, H8, H9, H10, H11, and H12. By This, the intake holes H7, H8, H9, H10, H11, and H12 communicate with the first communicating hole 40b in the changeover member 40. The first communicating hole 40b is in communication with the suction device 30 via the holes 40c and 11a. The first holes 40d and second holes 40e correspond to second communicating hole in the claims.

An elastic member 40f such as a rubber material is provided in the outer peripheral surface of the changeover member 40. The elastic member 40f covers the entire outer peripheral surface of the changeover member 40. Thus, insertion of the changeover member 40 into the hollow portion 13 brings the elastic member 40f into contact with the inner peripheral surface of the hollow portion 13. By This, the gap between the outer peripheral surface of the changeover member 40 and the inner peripheral surface of the hollow portion 13 is sealed.

Thus, in the present embodiment, the hollow portion 13 is in communication with the intake holes H1 to H12. The changeover member 40 is rotatably provided in the hollow portion 13, and the changeover member 40 is formed so as to extend along the inner peripheral surface of the hollow portion 13. The first holes 40d and second holes 40e are provided on the changeover member 40. Placing the changeover member 40 at the predetermined position in the rotating direction allows the intake holes H3, H4, H5, H8, H9, and H10 to communicate with the suction device 30. Placing the changeover member 40 at another predetermined position in the rotating direction allows the intake holes H7, H8, H9, H10, H11, and H12 to communicate with the suction device 30. Consequently, rotation of the changeover member 40 changes the range of air sucking intake holes. Therefore, the range of air sucking intake holes can be changed by the simple structure. It is very advantageous to reduce the manufacture cost of the drum body 1.

When the changeover member 40 is placed at the predetermined position in the rotating direction, the gap between the outer peripheral surface of the changeover member 40 and the inner peripheral surface of the hollow portion 13 is sealed so as to inhibit suction of air through the intake holes other than H3, H4, H5, H8, H9, and H10. On the other hand, when the changeover member 40 is placed at the another predetermined position in the rotating direction, the gap between the outer peripheral surface of the changeover member 40 and the inner peripheral surface of the hollow portion 13 is sealed so as to inhibit suction of air through the intake holes other than H7, H8, H9, H10, H11, and H12. Consequently, the range of air sucking intake holes is reliably changed.

The changeover member 40 is provided in the hollow portion 13, so the changeover member 40 does not project outward from the drum body 1 through the intake holes H1 to H12. Thus, for example, when a thin, soft sheet-like member SE such as an inner liner member is wound around the drum body 1, no unwanted contact mark is created on the sheet-like member SE. This makes it possible to improve the quality of the tire.

The air passage which communicates the intake holes H3, H4, H5, H8, H9, and H10 with the suction device 30 has the first communicating hole 40b which is provided in the changeover member 40 so as to extend in the axial direction of the drum body 1 and which is communicable with the suction device 30, and the plurality of second holes 40d which provided in the changeover member 40 and which communicates the intake holes H3, H4, H5, H8, H9, and H10 with the first communicating hole 40b. The air passage which communicates the intake holes H7, H8, H9, H10, H11, and H12 with the suction device 30 has the first communicating hole 40b, and the plurality of second holes 40e which are provided in the changeover member 40 and which communicate the intake holes H7, H8, H9, H10, H11, and H12 with the first communicating hole 40b. Thus, the air passages in the changeover member 40 have simple structures, so it is very advantageous for reducing the manufacture cost.

Figure 20:
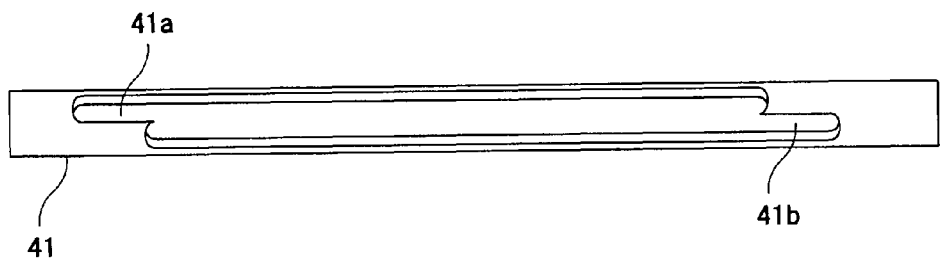
FIG. 20 is a side view of the changeover member showing a first variation of the second embodiment.

In the present embodiment, the changeover member 40 is tubular member and the above air passages are formed of the first communicating holes 40b and holes 40d and 40e. On the other hand, it is possible to use a changeover member 41 which has an air passage on its outer peripheral surface (see FIG. 20).

In this case, the hole 11a in the second drum member 11 is provided between the intake holes H6 and H7 and arrayed in one row with the intake holes H1 to H12. The changeover member 41 is cylindrical member and is rotatably inserted into the hollow portion 13. An outer peripheral surface of the changeover member 41 has a slightly smaller diameter than that of the inner peripheral surface of the hollow portion 13. A first groove 41a and a second groove 41b are provided on the outer peripheral surface of the changeover member 41 so as to extend in the axial direction of the changeover member 41. The grooves 41a and 41b are shifted from each other in the circumferential direction of the changeover member 41 and are in communication with each other. The first groove 41a is provided at a position corresponding to the intake holes H2 to H10. The second groove 41b is provided at a position corresponding to the intake holes H3 to H11.

Thus, when the changeover member 41 is placed at a predetermined position in the rotating direction, the intake holes H2 to H10 communicate with the suction device 30. When the changeover member 41 is placed at another predetermined position in the rotating direction, the intake holes H3 to H11 communicate with the suction device 30.

Figure 21:
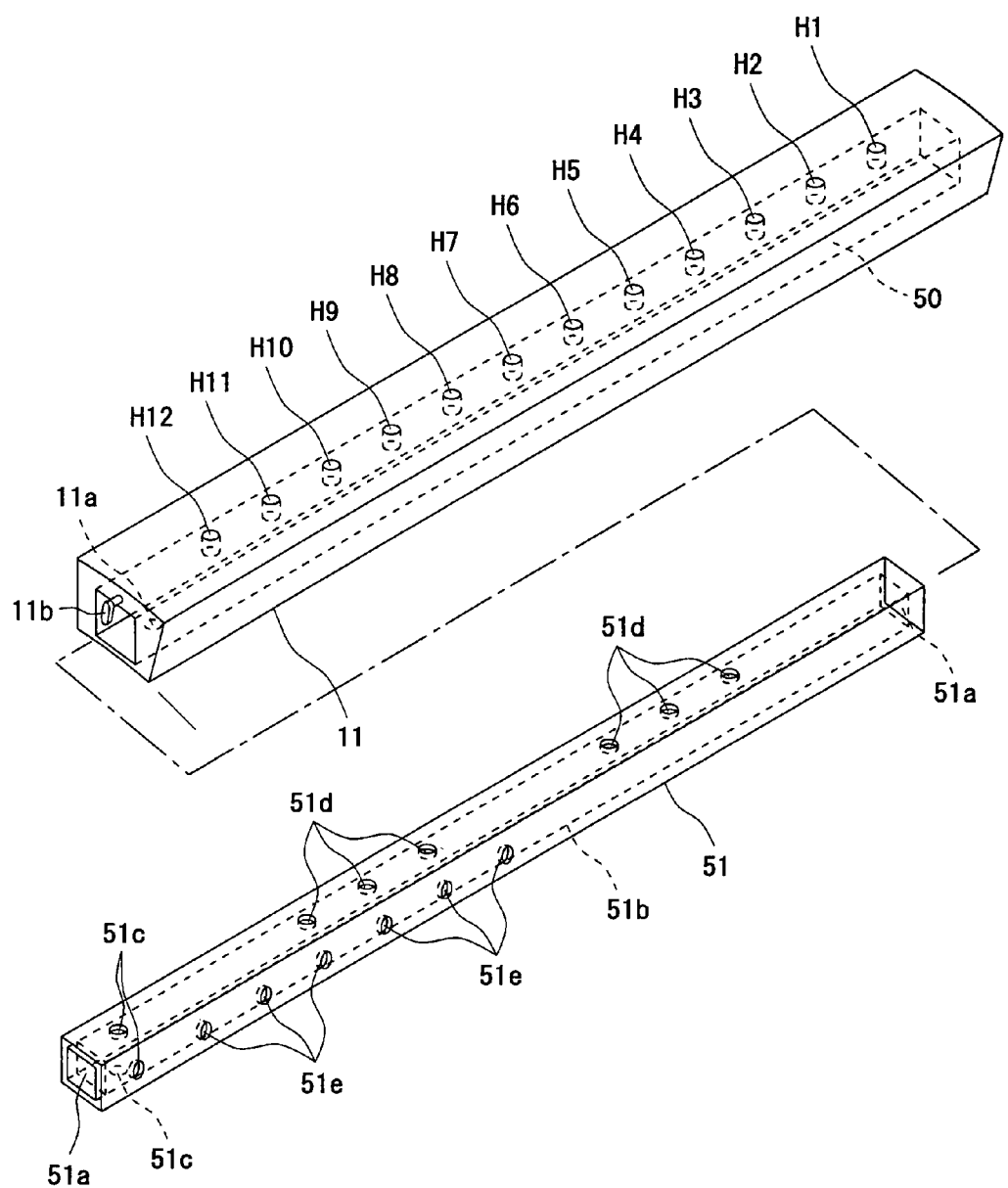
FIG. 21 is a perspective view of the second drum member showing a second variation of the second embodiment.

In the present embodiment, the hollow portion 13, composed of a circular hole, is provided in the second drum member 11. The changeover member 40 is an tubular member with a circular cross section which extends along the inner peripheral surface of the hollow portion 13. However, it is possible to provide a hollow portion 50 which is a hole with a polygonal cross section in the second drum member 11, and provide a changeover member 51 which is an tubular member with a polygonal cross section (see FIG. 21).

In this case, the hollow portion 50 extends along the intake holes H1 to H12. The hollow portion 50 is open in one end surface of the second drum member 11. The hole 11a is provided at one end side of the second drum member 11, and one end of the hole 11a is opened into the hollow portion 50. The other end of the hole 11a is connected to a suction device 30 equivalent to that in the first embodiment.

An outer peripheral surface of the changeover member 51 is formed so as to extend along an inner peripheral surface of the hollow portion 50. Both ends of the changeover member 51 are closed by end surface members 51a. A first communicating hole 51b is formed in the changeover member 51. A plurality of holes 51c are provided at one end side of the changeover member 51 so as to penetrate the changeover member 51. The holes 51c are provided at intervals from each other in the circumferential direction of the changeover member 51. The holes 51c are provided at an axial position corresponding to the hole 11a in the second drum member 11.

Six first holes 51d and four second holes 51e are provided in the changeover member 51 so as to penetrate the changeover member 51. The holes 51d and 51e are respectively arrayed in one row in the axial direction of the drum body 1. The first holes 51d is shifted from the second holes 51e in the circumferential direction of the changeover member 51. The first holes 51d are provided at positions corresponding to the intake holes H3, H4, H5, H8, H9, and H10 in the drum member 11. The second holes 51e are provided at positions corresponding to the intake holes H7, H8, H9, H10, H11, and H12. The first holes 51d and second holes 51e correspond to second communicating hole in the claims.

Thus, the range of air sucking intake holes is changed by pulling the changeover member 51 out of the hollow portion 13 and rotatively inserting the changeover member 51 into the hollow portion 50.

Figure 22:
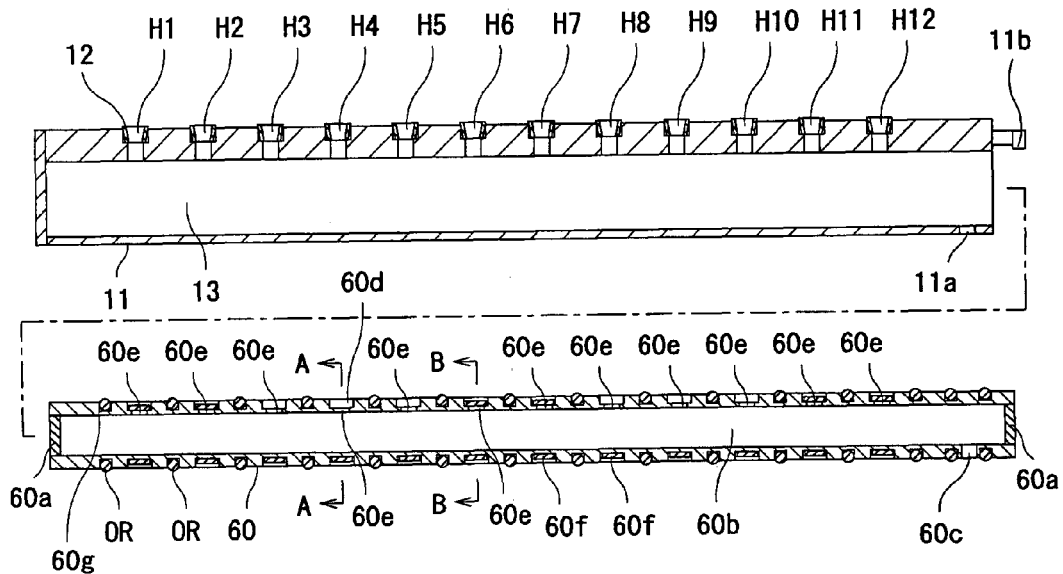
FIG. 22 is a side sectional view of the second drum member into which the changeover member has not been inserted yet, showing a third embodiment of the present invention.
Figure 23:
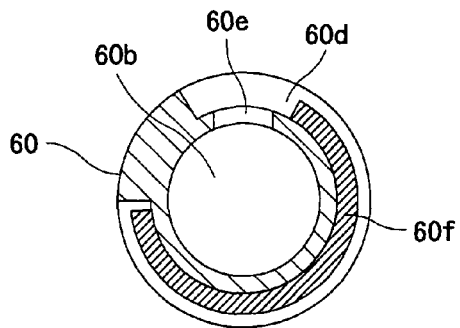
FIG. 23 is a sectional view taken along line A-A in FIG. 22.
Figure 24:
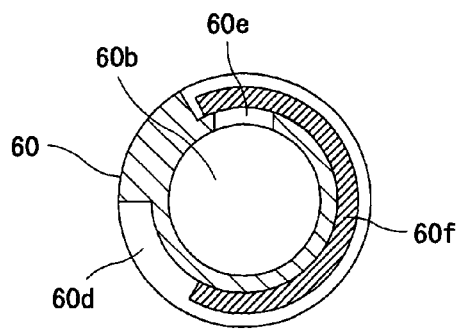
FIG. 24 is a sectional view taken along line B-B in FIG. 22.
Figure 25:
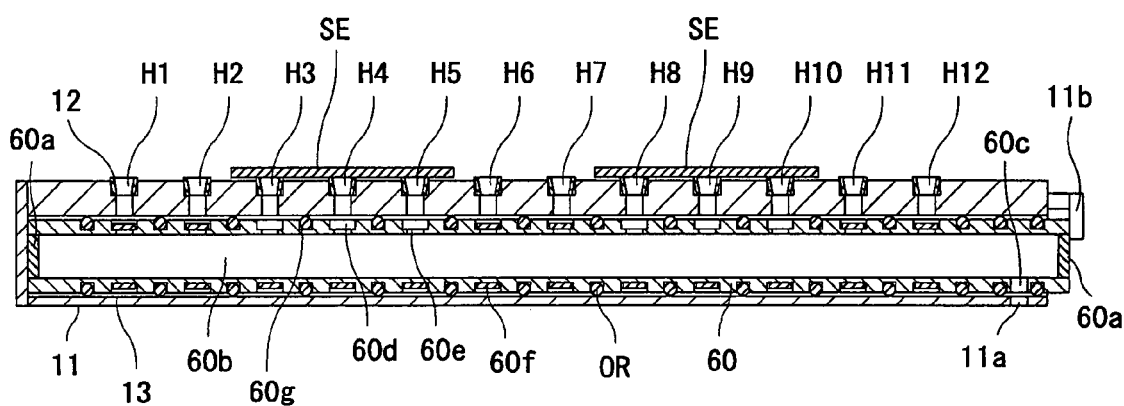
FIG. 25 is a side sectional view of the second drum member into which the changeover member has been inserted.
Figure 26:
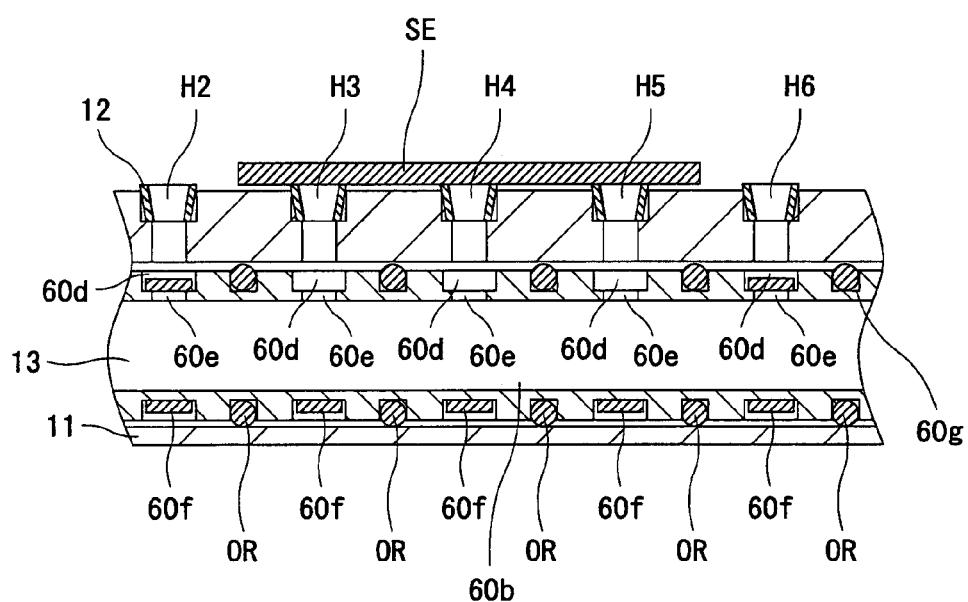
FIG. 26 is a side sectional view showing an essential part of the second drum member into which the changeover member has been inserted.

FIGS. 22 to 26 show a third embodiment of the present invention. FIG. 22 is a side sectional view of the second drum member into which the changeover member has not been inserted yet, showing a third embodiment of the present invention, FIG. 23 is a sectional view taken along line A-A in FIG. 22, FIG. 24 is a sectional view taken along line B-B in FIG. 22, FIG. 25 is a side sectional view of the second drum member into which the changeover member has been inserted, FIG. 26 is a side sectional view showing an essential part of the second drum member into which the changeover member has been inserted. Components equivalent to those of the first embodiment are denoted by the same reference symbols.

This winding drum for a sheet-like member includes the first drum members 10, the second drum member 11, the intake holes H1 to H12, the hollow portion 13, and the suction device 30, which are equivalent to those of the first embodiment, and a changeover member 60 releasably inserted into the hollow portion 13.

The changeover member 60 is a tubular member with a circular cross section. An outer peripheral surface of the changeover member 60 has a slightly smaller diameter than that of the inner peripheral surface of the hollow portion 13. Both ends of the changeover member 60 are closed by end surface members 60a. A first communicating hole 60b is formed in the changeover member 60. The changeover member 60 is slightly longer than the hollow portion 13 in the axial direction of the drum body 1. Thus, insertion of the changeover member 60 into the hollow portion 13 causes one end side of the changeover member 60 to project from the hollow portion 13. A hole 60c is formed at one end side of the changeover member 60 so as to penetrate the changeover member 60 in the radial direction. The hole 60c is formed at a position corresponding to the hole 11a in the second drum member 11. Thus, insertion of the changeover member 60 into the hollow portion 13 aligns the hole 60c in the changeover member 60 with the hole 11a in the second drum member 11.

Fitting grooves 60d are provided on the outer peripheral surface of the changeover member 60 and the fitting grooves are respectively disposed at positions corresponding to each of the intake holes H1 to H12. The fitting grooves 60d extend in the circumferential direction of the changeover member 60. Second communicating holes 60e are respectively provided in the changeover member 60 at positions corresponding to the intake holes H1 to H12. The second communicating holes 60e penetrate the changeover member 60 in the radial direction. One end of each of the second communicating holes 60e is open into the corresponding fitting groove 60d. Thus, when the changeover member 60 is inserted into the hollow portion 13, the second communicating holes 60e are able to establish communication the intake holes H1 to H12 with the first communicating hole 60b.

An ring-shaped member 60f is rotatably fitted into each of the fitting grooves 60d. When the ring-shaped member 60f is placed at a predetermined position in the rotating direction, the second communicating hole 60e is open. When the ring-shaped member 60f is placed at another predetermined position in the rotating direction, the second communicating hole 60e is close. For example, when the second communicating holes 60e corresponding to the intake holes H3, H4, H5, H8, H9, and H10 are opened and the changeover member 60 is inserted into the hollow portion 13, the intake holes H3, H4, H5, H8, H9, and H10 communicate with the first communicating hole 60b in the changeover member 60. Also the first communicating hole 60b is in communication with the suction device 30 via the holes 60c and 11a.

A plurality of O rings OR are attached to the outer peripheral surface of the changeover member 60 and consist of a well-known rubber material. The O rings OR are provided between each pair of adjacent intake holes H1 to H12, in an area closer to the other end of the changeover member than the intake hole H1, between the intake hole H12 and the hole 60c, and both sides of the hole 60c. The O rings OR are arranged in grooves 60g formed in the outer peripheral surface of the changeover member 60. The grooves 60g extend in the circumferential direction of the changeover member 60. An outer peripheral surface of each O ring OR projects slightly from the outer peripheral surface of the changeover member 60 in the radial direction. When the changeover member 60 is inserted into the hollow portion 13, the gap between the outer peripheral surface of the changeover member 60 and the inner peripheral surface of the hollow portion 13 is partitioned in the axial direction of the drum body 1 by each of the O ring OR. Thus, for example, when the suction device 30 is activated to suck air through the intake holes H3, H4, H5, H8, H9, and H10, the gap between the outer peripheral surface of the changeover member 60 and the inner peripheral surface of the hollow portion 13 is sealed so as to inhibit suction of air through the intake holes other than H3, H4, H5, H8, H9, and H10.

Thus, in the present embodiment, the hollow portion 13 is in communication with the intake holes H1 to H12. The changeover member 60 is releasably provided in the hollow portion 13, and the changeover member 60 is formed so as to extend along the inner peripheral surface of the hollow portion 13. The changeover member 60 has the first communicating hole 60b which is communicable with the suction device 30, the plurality of second communicating holes 60e which communicate the intake holes H1 to H12 with the first communicating hole 60b, and the plurality of ring-shaped members 60f which open and close respectively the second communicating holes 60e. Thus, when the second communicating holes 60e are opened or closed by the ring-shaped members 60f, the range of air sucking intake holes is changed. Therefore, the range of air sucking intake holes is changed by the simple structure, so it is very advantageous for reducing the manufacture cost of the drum body 1.

The O rings OR are provided between the outer peripheral surface of the changeover member 60 and the inner peripheral surface of the hollow portion 13. Thus, when the suction device 30 sucks air, for example, through the intake holes H3, H4, H5, H8, H9, and H10, the gap between the outer peripheral surface of the changeover member 60 and the inner peripheral surface of the hollow portion 13 is sealed so as to inhibit suction of air through the intake holes other than H3, H4, H5, H8, H9, and H10. Consequently, the range of air sucking intake holes is reliably changed.

The changeover member 60 is provided in the hollow portion 13, so the changeover member does not project outward from the drum body 1 through the intake holes H1 to H12. Thus, for example, when a thin, soft sheet-like member SE such as an inner liner member is wound around the drum body 1, no unwanted contact mark is created on the sheet-like member SE. This makes it possible to improve the quality of the tire.

The plurality of ring-shaped members 60f are provided on the outer peripheral surface of the changeover member 60. The ring-shaped members 60f are rotatably fitted into the outer peripheral surface of the changeover member 60. when the ring-shaped member 60f is placed at the predetermined position in the rotating direction, the second communicating hole 60e is opened. when the ring-shaped member 60f is placed at the another predetermined position in the rotating direction, the second communicating hole 60e is closed. This enables each second communicating hole 60e to be easily switched between an open state and a closed state.

The gap between the outer peripheral surface of the changeover member 60 and the inner peripheral surface of the hollow portion 13 is sealed by the O rings OR, which are attached on the changeover member 60. By this, the gap between the outer peripheral surface of the changeover member 60 and the inner peripheral surface of the hollow portion 13 is sealed by the simple structure.

Figure 27:
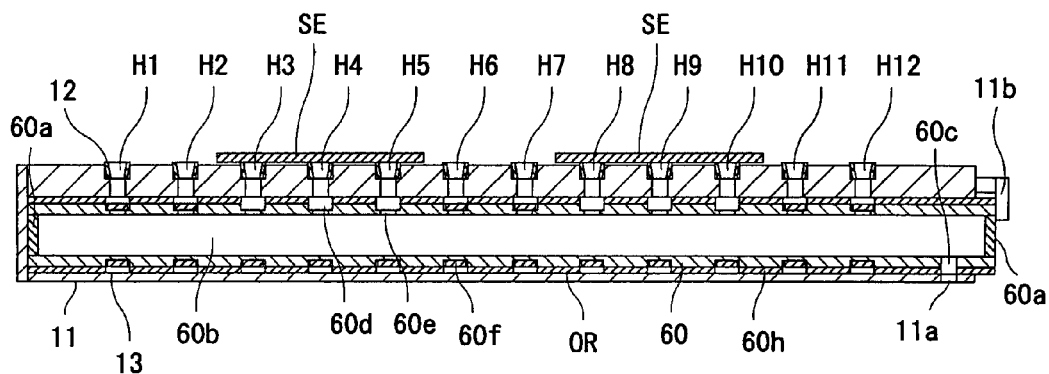
FIG. 27 is a side sectional view of the second drum member showing a first variation of the third embodiment.

In the present embodiment, the plurality of O rings OR are provided in the outer peripheral surface of the changeover member 60, and the O rings OR seal the gap between the outer peripheral surface of the changeover member 60 and the inner peripheral surface of the hollow portion 13. However, it is possible to cover the changeover member 60 by an elastic member 60h which is, for example, made of rubber material and to seal the gap between the outer peripheral surface of the changeover member 60 and the inner peripheral surface of the hollow portion 13 by the elastic member 60h (see FIG. 27).

In this case, the elastic member 60h covers the entire outer peripheral surface of the changeover member 60 except for the fitting grooves 60d. The elastic member 60h is adhesively fixed to the outer peripheral surface of the changeover member 60. Thus, insertion of the changeover member 60 into the hollow portion 13 brings the elastic member 60h into contact with the inner peripheral surface of the hollow portion 13. This seals the gap between the outer peripheral surface of the changeover member 60 and the inner peripheral surface of the hollow portion 13.

Figure 28:
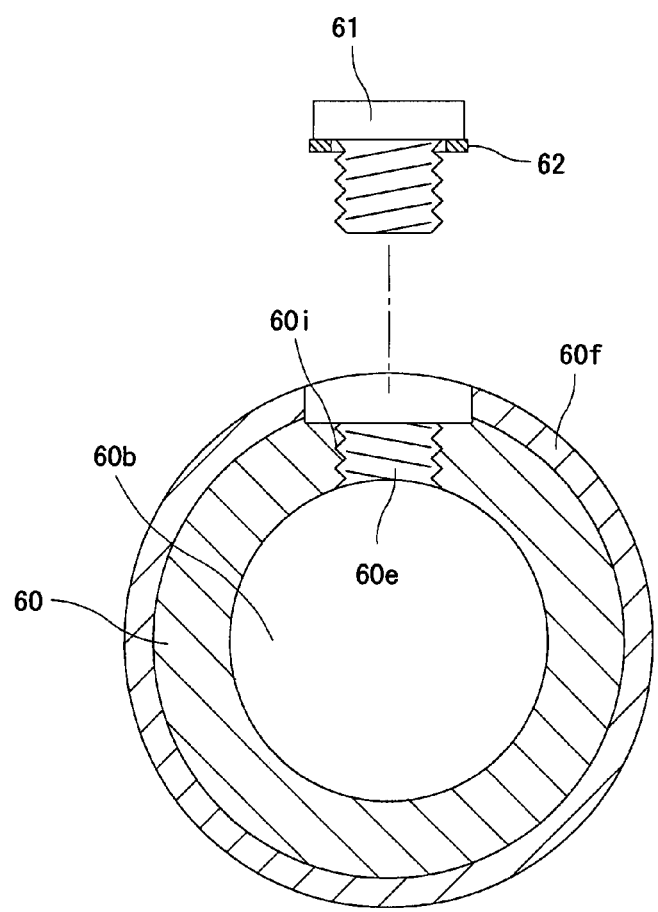
FIG. 28 is a sectional view of the changeover member showing a second variation of the third embodiment.

In the present embodiment, the plurality of ring-shaped members 60f are provided in the outer peripheral surface of the changeover member 60. Rotation of each ring-shaped member 60f opens or closes the corresponding second communicating hole 60e. However, each of the second communicating holes 60e may be internally threaded so that a screw 61 can be screwed into the internal thread 60i. Then, the second communicating hole 60e can be opened and closed by attaching and removing the screw 61 to and from the second communicating hole 60e (see FIG. 28). In this case, a washer 62 provided on a bearing surface of the screw 61 allows the second communicating hole 60e to be reliably closed; the washer 62 consists of an elastic member. Alternatively, if the elastic member 60h, covering the changeover member 60, is provided on the bearing surface of the screw 61, each second communicating hole 60e is reliably closed without the need for the washer 62. Alternatively, instead of the screw 61, a rubber stopper may be attached to and removed from each second communicating hole 60e to open and close it.

Figure 29:
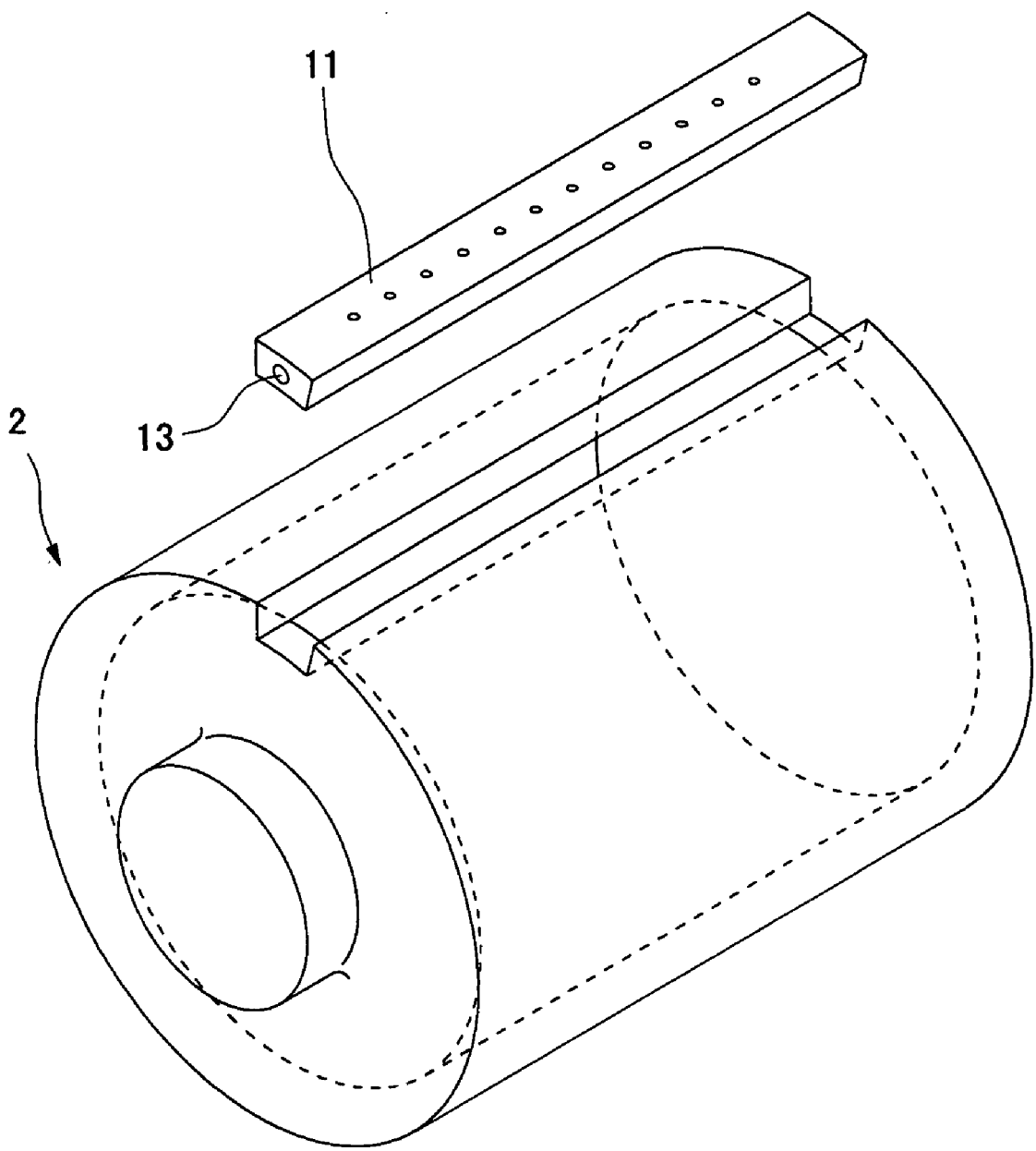
FIG. 29 is a perspective view of the drum body showing a third variation of the third embodiment.

In the present embodiment, the outer peripheral surface of the drum body 1 is formed of the plurality of first drum members 10 and the second drum member 11. However, the second drum member 11 may be provided in a circumferential part of the hollow drum body 2 (see FIG. 29). Alternatively, the drum body 2 may be integrated with the second drum member 11.

The preferred embodiments described in this specification are illustrative and not restrictive. The scope of invention is given by the appended claims, and all changes and modifications included in the meaning of claims are embraced in the present invention.

What is claimed is:

1. A winding drum for a sheet-like member, comprising:
   a drum body having an outer peripheral surface around which the sheet-like member can be wound;
   a plurality of intake holes provided on the outer peripheral surface of the drum body at a predetermined position in the circumferential direction of the drum body, the intake holes being arranged in the axial direction of the drum body;
   a sucking means for sucking air through the intake holes so that the intake holes suck the sheet-like member when the sheet-like member is wound around the outer peripheral surface of the drum body;
   a hollow portion provided in the drum body so as to extend along the intake holes in the axial direction of the drum body, the hollow portion being communicated with each of the intake holes;
   a changeover member formed so as to extend along the hollow portion, the changeover member having an outer peripheral surface formed so as to extend along an inner peripheral surface of the hollow portion, the changeover member being rotatably provided in the hollow portion;
   an air passage provided on the changeover member, the air passage which communicates intake holes of a predetermined range in the axial direction of the drum body with the sucking means when the changeover member is placed at a predetermined position in a rotating direction of the changeover member, the air passage which communicates intake holes of another predetermined range in the axial direction of the drum body with the sucking means when the changeover member is placed at another predetermined position in the rotating direction of the changeover member; and
   a seal member provided between the outer peripheral surface of the changeover member and the inner peripheral surface of the hollow portion;
   wherein the seal member seals a gap between the outer peripheral surface of the changeover member and the inner peripheral surface of the hollow portion so as to inhibit suction of air through intake holes of a range other than said predetermined range when the changeover member is placed at said predetermined position in the rotating direction, and the gap between the outer peripheral surface of the changeover member and the inner peripheral surface of the hollow portion so as to inhibit suction of air through intake holes of a range other than said another predetermined range when the changeover member is placed at said another predetermined position in the rotating direction.

2. The winding drum for the sheet-like member according to claim 1, wherein
   the air passage has:
   a first communicating hole which is provided on the changeover member so as to extend in the axial direction of the drum body, the first communicating hole which is communicable with the sucking means; and
   a second communicating hole which is provided on the changeover member, the second communicating hole which communicates intake holes of said predetermined range with the first communicating hole when the changeover member is placed at said predetermined position in the rotating direction, the second communicating hole which communicates intake holes of said another predetermined range with the first communicating hole when the changeover member is placed at said another predetermined position in the rotating direction.

3. The winding drum for the sheet-like member according to claim 1, wherein
   the air passage has a concave portion which is provided on the outer peripheral surface of the changeover member, the concave portion which communicates intake holes of said predetermined range with the sucking means when the changeover member is placed at said predetermined position in the rotating direction, the concave portion which communicates intake holes of said another predetermined range with the sucking means when the changeover member is placed at said another predetermined position in the rotating direction.

4. The winding drum for the sheet-like member according to claim 1, wherein
   the changeover member is releasably attached in the hollow portion.

5. The winding drum for the sheet-like member according to claim 1, wherein
   the seal member is a plurality of annular elastic members attached to the outer peripheral surface of the changeover member so that each of the annular elastic member partition respectively the gap between the outer peripheral surface of the changeover member and the inner peripheral surface of the hollow portion in the axial direction of the drum body.

6. The winding drum for the sheet-like member according to claim 1, wherein
   the seal member is an elastic member which covers the outer peripheral surface of the changeover member and which contact with the inner peripheral surface of the hollow portion.

7. The winding drum for the sheet-like member according to claim 1, wherein
   the outer peripheral surface of the drum body has a plurality of drum members arranged at intervals from each other in the circumferential direction of the rum body, and
   at least one of the drum members have the intake holes and the hollow portion.

* * * * *